(12) United States Patent
Ri

(10) Patent No.: US 12,453,662 B2
(45) Date of Patent: Oct. 28, 2025

(54) APPARATUS FOR ASSESSING PERFORMANCE OF ABSORBENT ARTICLES

(71) Applicant: DAIO PAPER CORPORATION, Shikokuchuo (JP)

(72) Inventor: Mizuki Ri, Ehime (JP)

(73) Assignee: Daio Paper Corporation, Ehime (JP)

( * ) Notice: Subject to any disclaimer, the term of this patent is extended or adjusted under 35 U.S.C. 154(b) by 287 days.

(21) Appl. No.: 18/040,082

(22) PCT Filed: Aug. 20, 2021

(86) PCT No.: PCT/JP2021/030568
§ 371 (c)(1),
(2) Date: Jan. 31, 2023

(87) PCT Pub. No.: WO2022/054539
PCT Pub. Date: Mar. 17, 2022

(65) Prior Publication Data
US 2023/0240916 A1    Aug. 3, 2023

(30) Foreign Application Priority Data
Sep. 14, 2020  (JP) .................. 2020-153576

(51) Int. Cl.
*A61F 13/84*  (2006.01)
(52) U.S. Cl.
CPC ...... *A61F 13/84* (2013.01); *A61F 2013/8488* (2013.01)
(58) Field of Classification Search
CPC .. G01N 27/223; G01N 33/246; G01N 27/048; G01N 19/10; G01N 27/121;
(Continued)

(56) References Cited

U.S. PATENT DOCUMENTS

| 6,981,951 B1 * | 1/2006 | Rahe .................. | G01N 33/5094 |
| | | | 600/584 |
| 8,500,710 B2 * | 8/2013 | Takino .................. | A61F 13/539 |
| | | | 604/385.27 |

(Continued)

FOREIGN PATENT DOCUMENTS

| DE | 202008018597 U1 * | 5/2016 | .......... A61F 13/496 |
| JP | H9253126 A | 9/1997 | |

(Continued)

OTHER PUBLICATIONS

International Search Report for PCT/JP2021/030568, dated Nov. 2, 2021.

*Primary Examiner* — Andre J Allen
(74) *Attorney, Agent, or Firm* — Andrus Intellectual Property Law, LLP

(57) ABSTRACT

Provided is apparatus for assessing performance of absorbent articles which is capable of assessment closely resembling assessment of performance of an absorbent article worn by a wearer. The apparatus for assessing performance of an absorbent article has a mount including an inner mount part for bearing a body-facing surface of an absorbent article and an outer mount part for bearing a surface of the absorbent article opposite from the body-facing surface, and a cradle for supporting the mount, the inner and outer mount parts are formed of a transparent resin, the external contour of the inner mount part represents the figures of the abdomen and the hips of a wearer, and the internal contour of the outer mount part represents the figures of the abdomen and the hips of the wearer and is larger in size than the external contour of the inner mount part.

6 Claims, 15 Drawing Sheets

(58) Field of Classification Search
CPC ........ G01N 31/222; G01N 25/56; G01N 5/02;
G01N 22/04; G01N 33/346; G01N 5/045;
G01N 5/025; G01N 15/08; G01N 33/24;
G01N 33/10; G01N 33/383; G01N
15/0893; G01N 21/3554; G01N 33/46;
G01N 7/10; G01N 13/02; G01N 33/0098;
G01N 33/2847; G01N 21/81; G01N
27/226; G01N 33/367; G01N 33/00;
G01N 15/0826; G01N 33/42; G01N 7/14;
G01N 15/082; G01N 2291/0256; G01N
27/225; G01N 33/36; G01N 17/00; G01N
25/68; G01N 29/036; G01N 33/38; G01N
9/02; G01N 9/36; G01N 2015/0873;
G01N 25/18; G01N 29/11; G01N 3/08;
G01N 5/04; G01N 1/20; G01N 1/40;
G01N 13/00; G01N 15/0866; G01N
21/359; G01N 21/65; G01N 22/00; G01N
2291/02845; G01N 23/16; G01N 25/66;
G01N 27/12; G01N 27/423; G01N 33/02;
G01N 33/025; G01N 33/12; G01N
33/4833; G01N 9/24; G01N 1/405; G01N
13/04; G01N 2021/656; G01N 21/3559;
G01N 21/3563; G01N 21/431; G01N
21/86; G01N 2201/08; G01N 2203/0019;
G01N 25/00; G01N 27/043; G01N 27/06;
G01N 29/022; G01N 33/26; G01N 35/00;
G01N 1/2214; G01N 1/44; G01N 11/14;
G01N 15/0205; G01N 15/088; G01N
17/02; G01N 2001/4027; G01N
2009/022; G01N 21/15; G01N 21/314;
G01N 21/4738; G01N 21/8507; G01N
2203/021; G01N 2203/0282; G01N
2291/014; G01N 2291/02441; G01N
2291/0255; G01N 2291/102; G01N
25/14; G01N 25/58; G01N 27/041; G01N
29/07; G01N 29/28; G01N 29/30; G01N
31/22; G01N 31/221; G01N 33/245;
G01N 33/34; G01N 5/00; G01N 7/04;
G01N 1/14; G01N 1/2035; G01N 1/286;
G01N 1/34; G01N 17/002; G01N 17/004;
G01N 2011/0053; G01N 2013/0208;
G01N 2013/0275; G01N 2021/8466;
G01N 2035/0441; G01N 2035/0484;
G01N 21/29; G01N 21/33; G01N 21/552;
G01N 21/7703; G01N 21/78; G01N
21/80; G01N 21/89; G01N 21/8901;
G01N 2203/0016; G01N 2203/0025;
G01N 2203/0676; G01N 2223/613; G01N
2291/0237; G01N 2291/0238; G01N
2291/0251; G01N 2291/02818; G01N
2291/02827; G01N 2291/02881; G01N
2291/0422; G01N 2291/0426; G01N
2291/0427; G01N 2291/044; G01N
23/06; G01N 23/09; G01N 25/02; G01N
25/48; G01N 25/64; G01N 27/00; G01N
27/026; G01N 27/046; G01N 27/07;
G01N 27/122; G01N 27/18; G01N
27/4166; G01N 27/42; G01N 27/72;
G01N 29/2462; G01N 29/326; G01N
3/46; G01N 30/00; G01N 31/168; G01N
33/0011; G01N 33/0091; G01N 33/0093;
G01N 33/1833; G01N 33/241; G01N
33/32; G01N 33/362; G01N 33/365;
G01N 33/48; G01N 33/5088; G01N
35/028; G01N 35/04; G01N 7/02; G01N
1/00; G01N 1/04; G01N 1/18; G01N
1/2226; G01N 1/2273; G01N 1/2294;
G01N 1/4005; G01N 1/4055; G01N
11/06; G01N 11/10; G01N 11/142; G01N
11/165; G01N 15/0618; G01N 15/0631;
G01N 15/0656; G01N 19/04; G01N
2001/2007; G01N 2001/2241; G01N
2001/2866; G01N 2001/4083; G01N
2009/024; G01N 2009/026; G01N
2011/0046; G01N 2013/025; G01N
2013/0258; G01N 2013/0283; G01N
15/0853; G01N 2015/086; G01N
2021/0339; G01N 2021/151; G01N
2021/1706; G01N 2021/354; G01N
2021/3595; G01N 2021/6419; G01N
2021/6421; G01N 2021/6432; G01N
2021/6439; G01N 2021/6441; G01N
2021/7723; G01N 2021/7786; G01N
2035/00336; G01N 2035/00346; G01N
2035/00356; G01N 2035/00524; G01N
2035/00531; G01N 2035/0097; G01N
2035/0424; G01N 2035/0443; G01N
2035/0444; G01N 2035/0455; G01N
2035/0491; G01N 2035/103; G01N
21/00; G01N 21/1702; G01N 21/251;
G01N 21/27; G01N 21/274; G01N
21/276; G01N 21/3151; G01N 21/35;
G01N 21/3577; G01N 21/3581; G01N
21/37; G01N 21/39; G01N 21/43; G01N
21/47; G01N 21/474; G01N 21/55; G01N
21/554; G01N 21/59; G01N 21/64; G01N
21/6428; G01N 21/6447; G01N 21/645;
G01N 21/6454; G01N 21/6456; G01N
21/658; G01N 21/69; G01N 21/76; G01N
21/94; G01N 2201/0221; G01N
2201/0415; G01N 2201/0621; G01N
2203/0005; G01N 2203/007; G01N
2203/0017; G01N 2203/0039; G01N
2203/0044; G01N 2203/0075; G01N
2203/0076; G01N 2203/0078; G01N
2203/0092; G01N 2203/0094; G01N
2203/0236; G01N 2203/0256; G01N
2203/0278; G01N 2203/0284; G01N
2203/0682; G01N 2203/0688; G01N
2223/01; G01N 2223/04; G01N
2223/205; G01N 2223/505; G01N
2223/616; G01N 2223/633; G01N
2223/636; G01N 2223/643; G01N
2291/011; G01N 2291/015; G01N
2291/0212; G01N 2291/0228; G01N
2291/0231; G01N 2291/02491; G01N
2291/0253; G01N 2291/02809; G01N
2291/02854; G01N 2291/02863; G01N
2291/0421; G01N 2291/048; G01N
2291/105; G01N 2291/2634; G01N
2291/265; G01N 2291/2698; G01N
23/00; G01N 23/083; G01N 23/12; G01N
23/203; G01N 24/081; G01N 24/085;
G01N 25/142; G01N 25/44; G01N 25/72;
G01N 2500/00; G01N 27/002; G01N
27/02; G01N 27/023; G01N 27/028;
G01N 27/045; G01N 27/125; G01N
27/126; G01N 27/185; G01N 27/205;
G01N 27/4146; G01N 27/416; G01N 27/4162; G01N 27/60; G01N 24/605; G01N 27/82; G01N 29/02; G01N 29/0609; G01N 29/0618; G01N 29/227; G01N 29/288; G01N 29/2412; G01N 29/2418; G01N 29/42; G01N 29/4418; G01N 29/4436; G01N 29/4454; G01N 29/4472; G01N 29/46; G01N 29/50; G01N 3/00; G01N 3/066; G01N 3/10; G01N 3/30; G01N 3/32; G01N 3/36; G01N 3/40; G01N 3/56; G01N 30/12; G01N 31/00; G01N 31/10; G01N 31/229; G01N 33/0003; G01N 33/0016; G01N 33/0031; G01N 33/0036; G01N 33/007; G01N 33/0083; G01N 33/0095; G01N 33/03; G01N 33/18; G01N 33/222; G01N 33/243; G01N 33/2823; G01N 33/2829; G01N 33/2835; G01N 33/343; G01N 33/388; G01N 33/44; G01N 33/447; G01N 33/5008; G01N 33/5044; G01N 33/5438; G01N 33/60; G01N 33/68; G01N 33/94; G01N 35/00009; G01N 35/00603; G01N 35/00663; G01N 35/00693; G01N 35/0092; G01N 35/0098; G01N 35/0099; G01N 35/025; G01N 35/026; G01N 35/1002; G01N 7/00; G01N 7/16; G01N 7/18; G01N 9/00; G01N 9/06; G01N 9/08; G01N 9/26; A61F 13/42; A61F 13/15203; A61F 2013/8491; A61F 13/84; A61F 2013/8488; A61F 13/20; A61F 13/53; A61F 2013/424; A61F 13/2051; A61F 2013/15284; A61F 2013/8497; A61F 13/00; A61F 13/00051; A61F 13/2074; A61F 13/2077; A61F 13/26; A61F 13/49009; A61F 13/513; A61F 13/5323; A61F 13/534; A61F 2002/6614; A61F 2002/7695; A61F 2013/00429; A61F 2013/00442; A61F 2013/00851; A61F 2013/00944; A61F 2013/00961; A61F 2013/15056; A61F 2013/421; A61F 2013/422; A61F 2013/423; A61F 2013/49092; A61F 2013/51002; A61F 2013/51409; A61F 2013/51411; A61F 2013/51427; A61F 2013/53013; A61F 2013/530182; A61F 2013/530306; A61F 2013/530335; A61F 2013/530437; A61F 2013/530481; A61F 2013/530489; A61F 2013/53051; A61F 2013/530708; A61F 2013/530934; A61F 2013/53908; A61F 2013/5694; A61F 2013/583; A61F 2013/8473; A61F 5/48; A61F 6/04

USPC .................................................. 73/73
See application file for complete search history.

(56) References Cited

U.S. PATENT DOCUMENTS 11,612,356 B2 * 3/2023 Dong .................. A61B 5/6808
600/584
2006/0105316 A1 5/2006 Harkin

FOREIGN PATENT DOCUMENTS

JP          201126733 A     2/2011
JP         2018183491 A * 11/2018

* cited by examiner

[FIG.7]
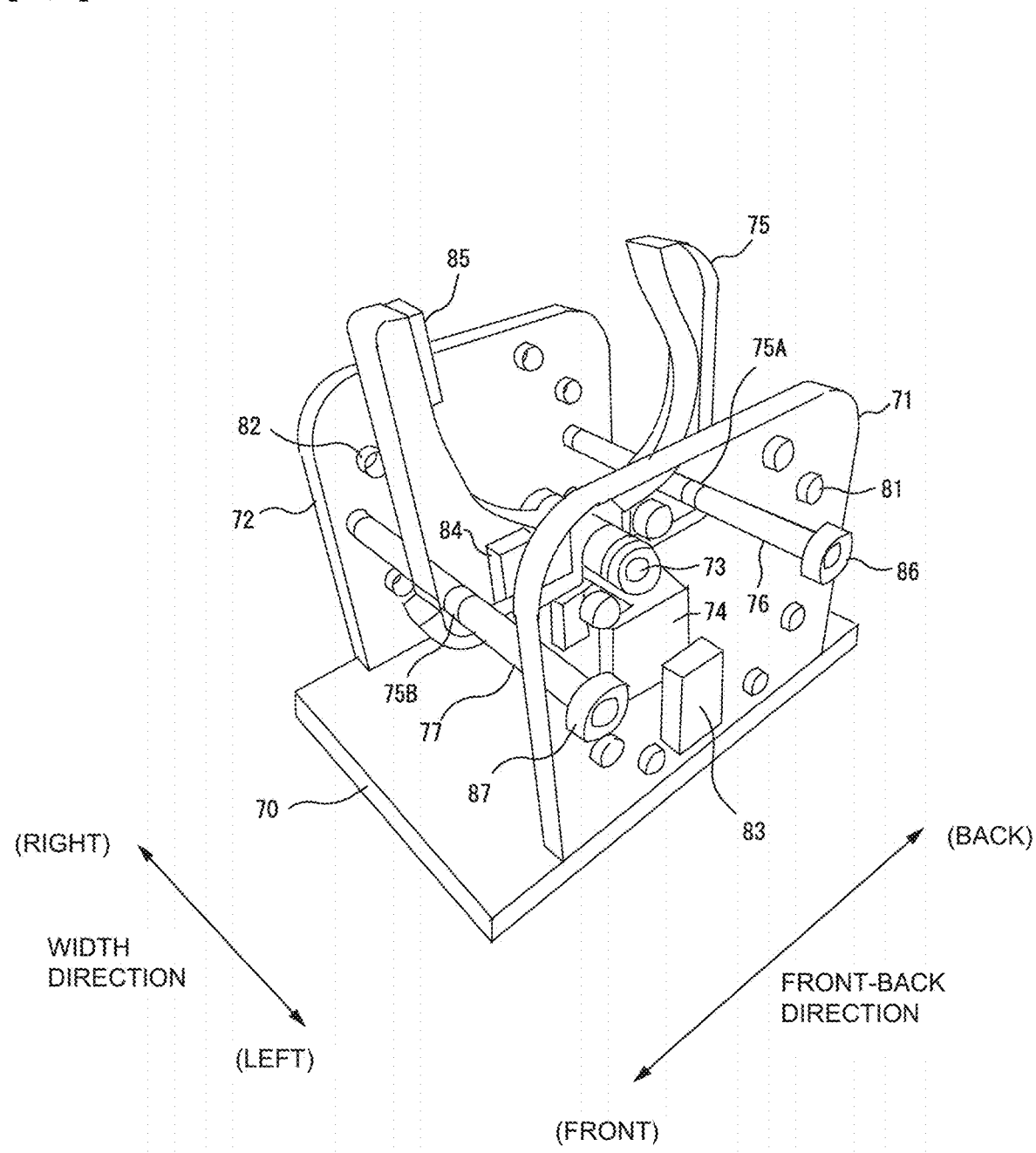

[FIG.8]
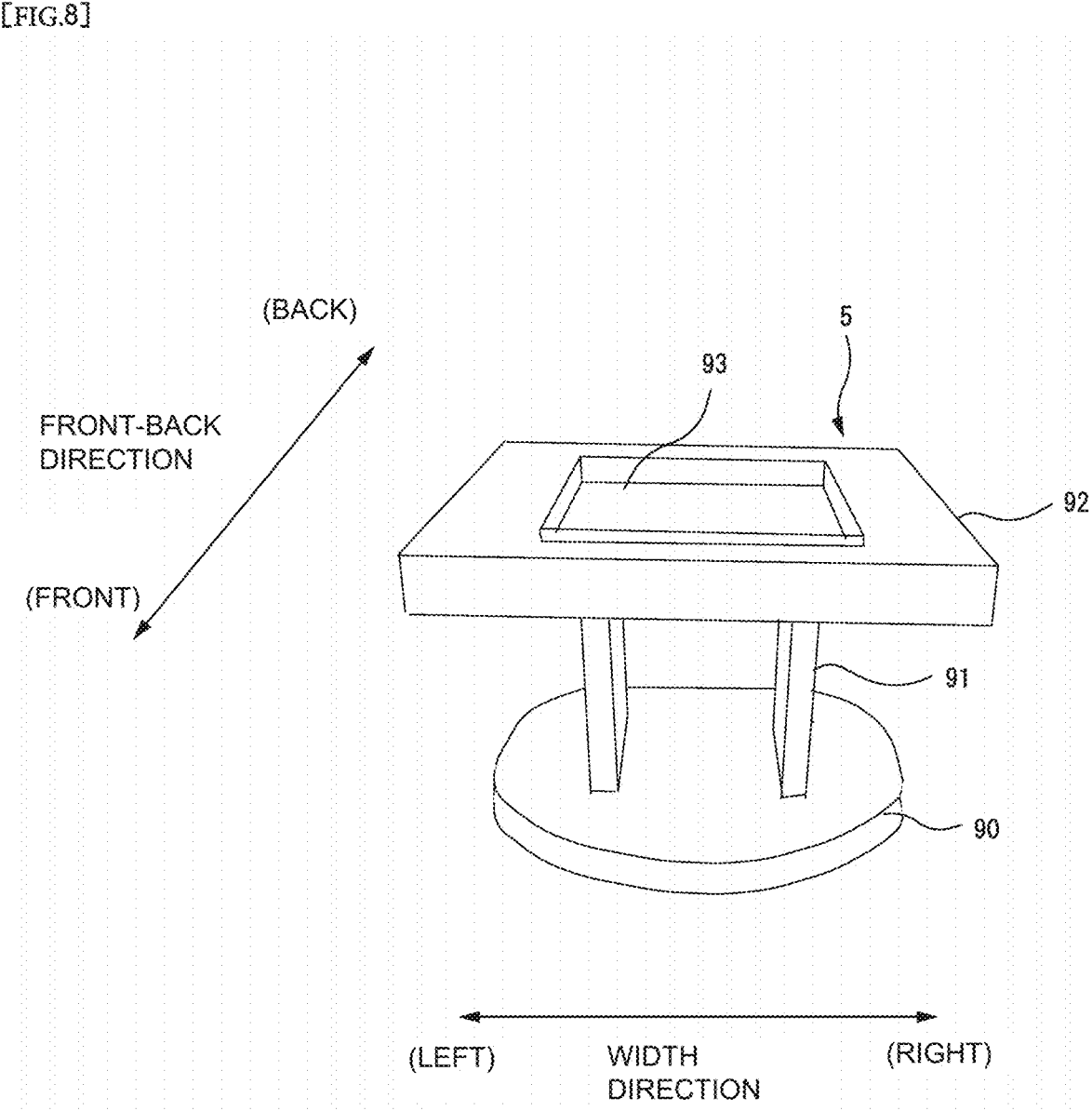

[FIG.9]
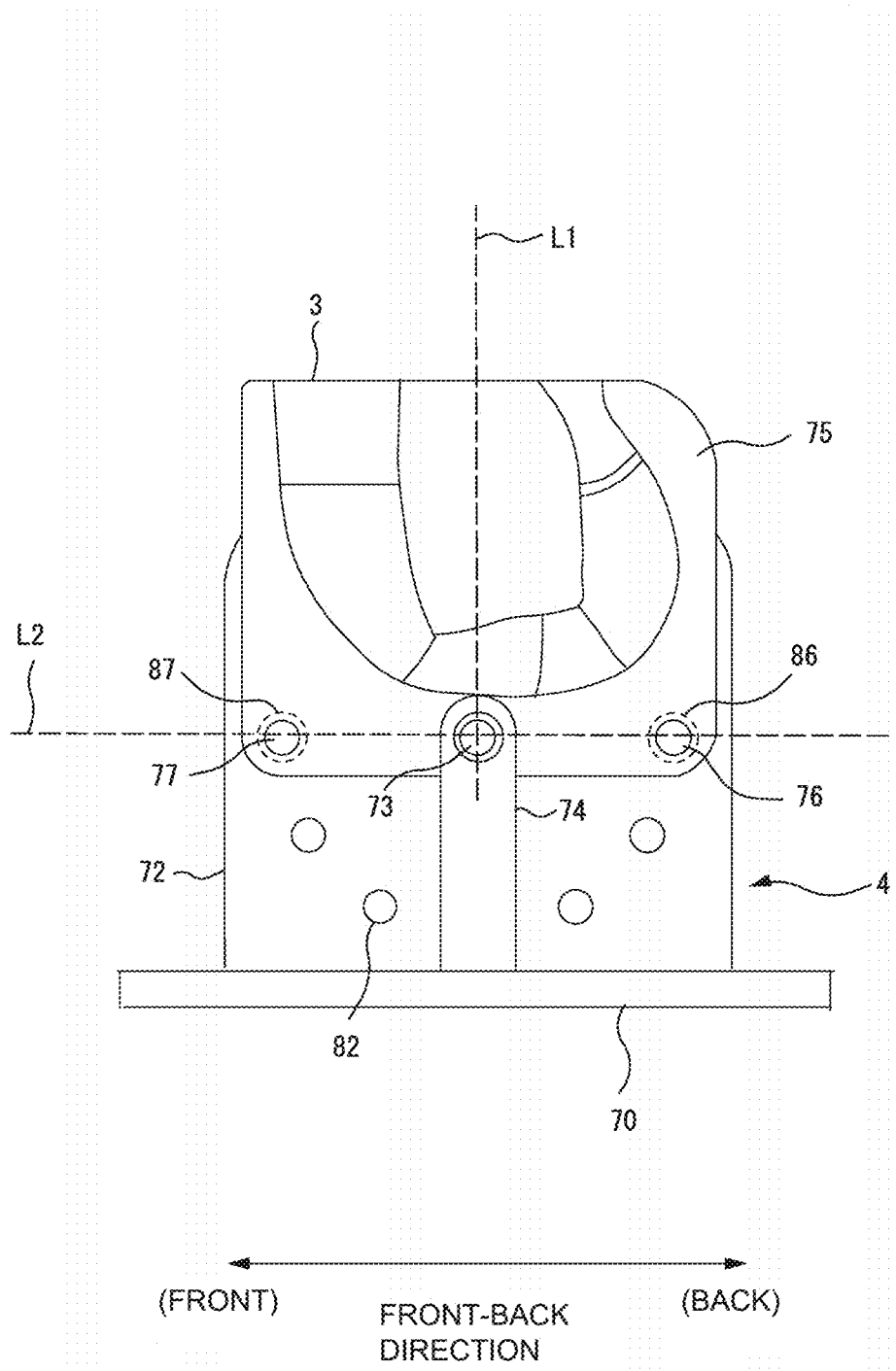

[FIG.10]
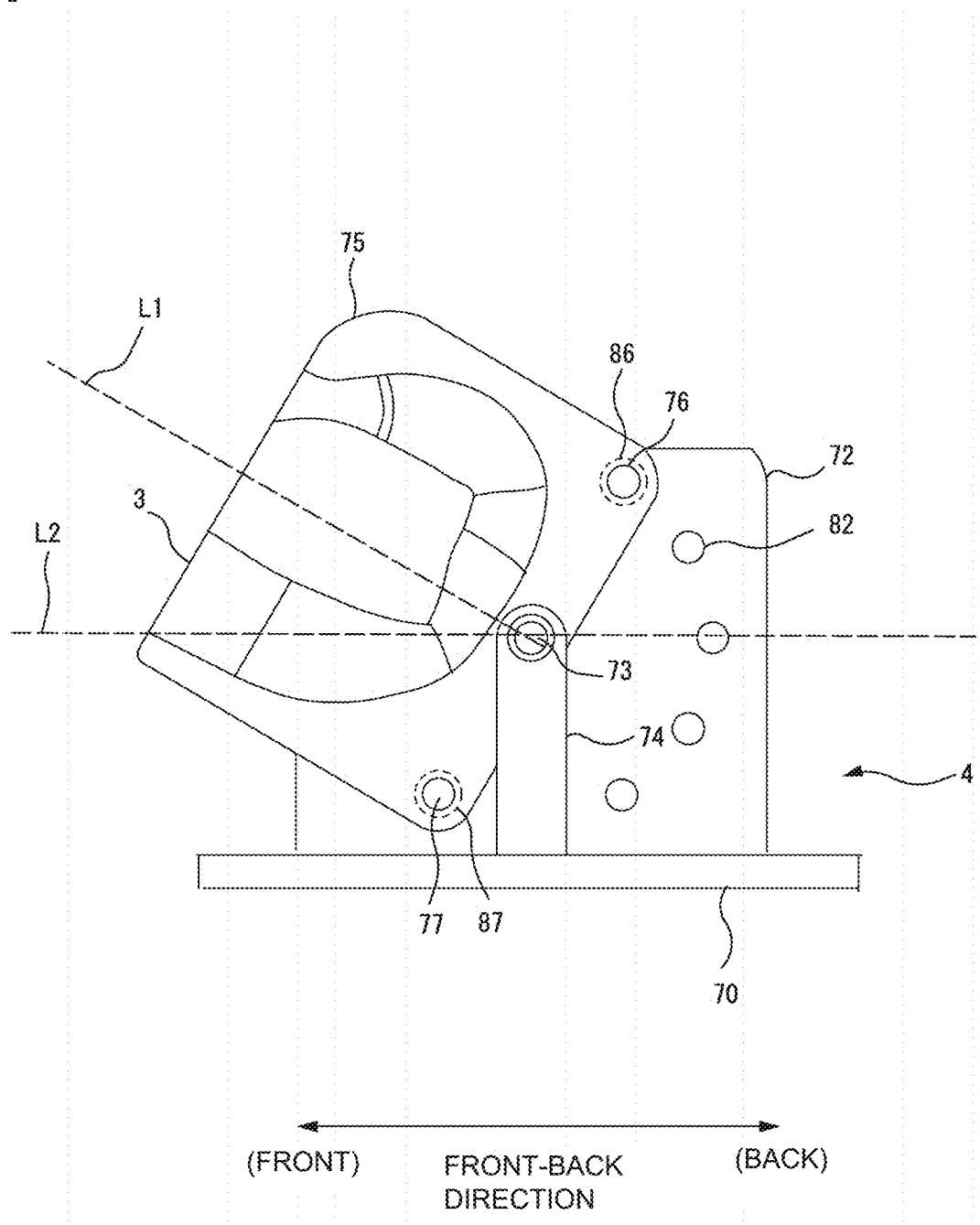

[FIG.11]
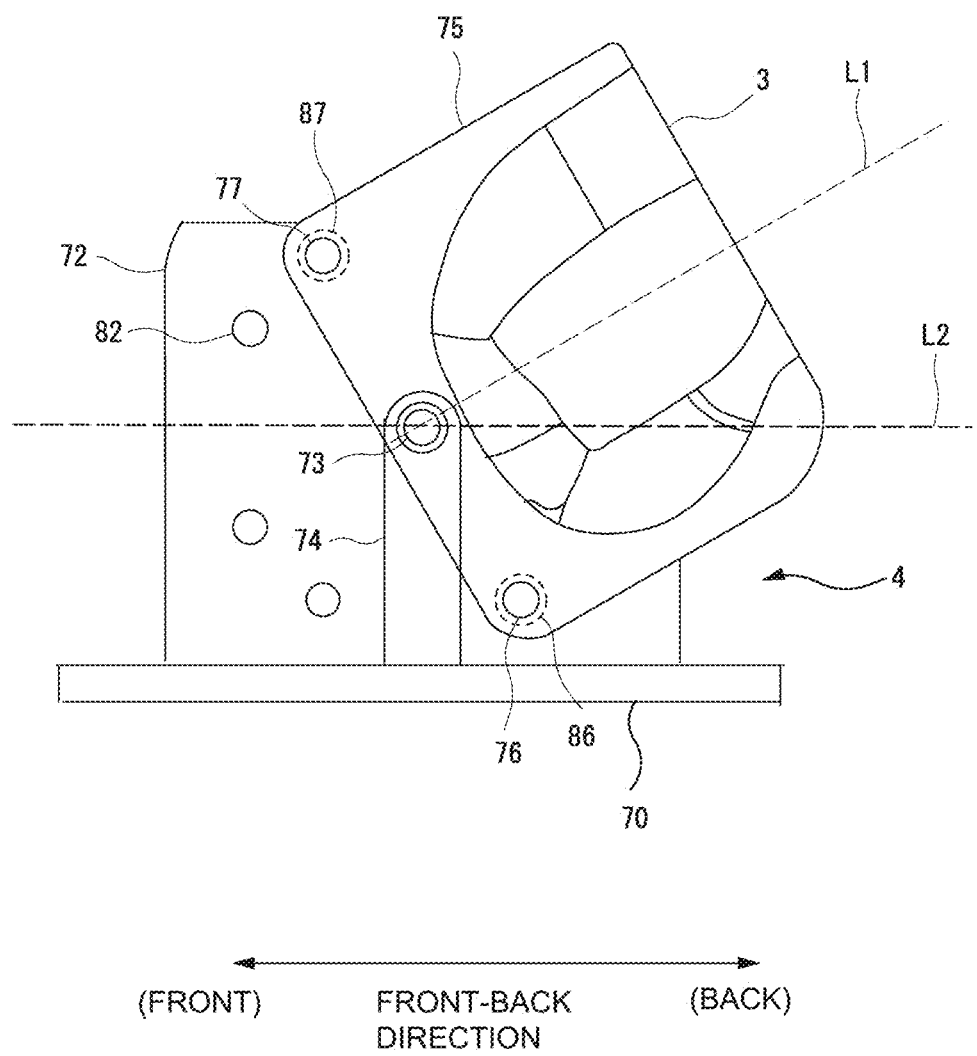
(FRONT) ←→ (BACK)
FRONT-BACK DIRECTION

[FIG.12]
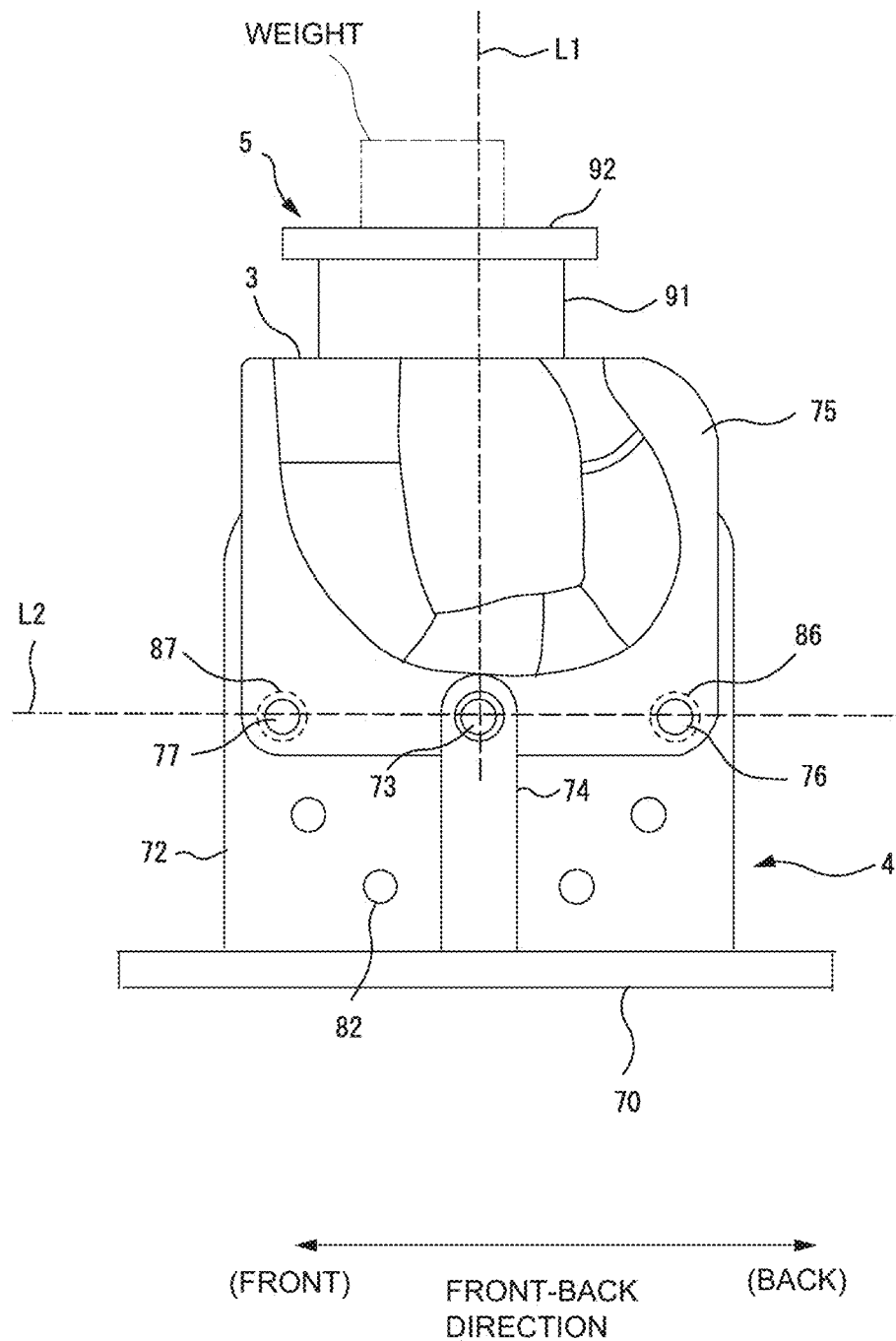

[FIG.13]
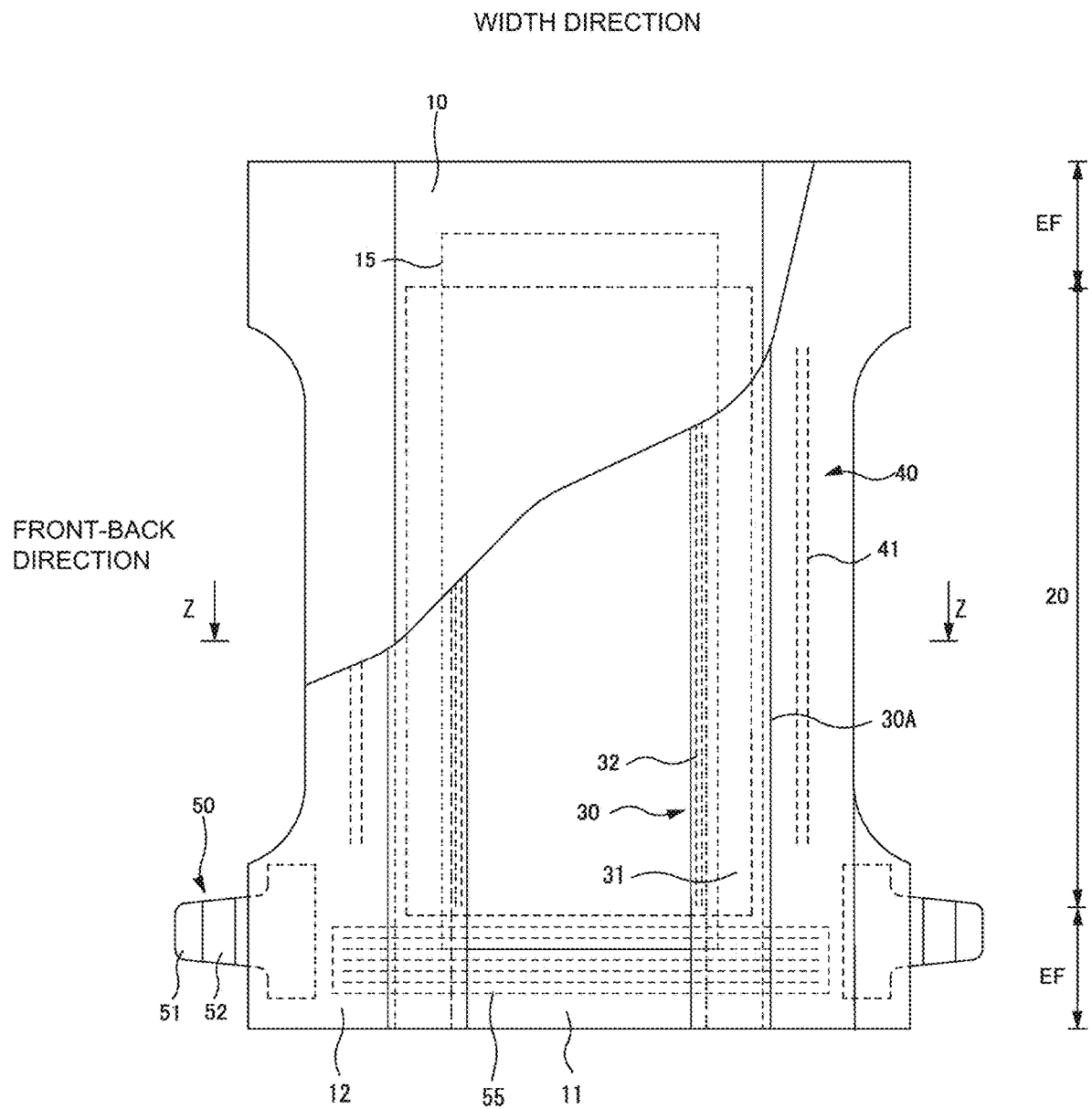

[FIG.14]
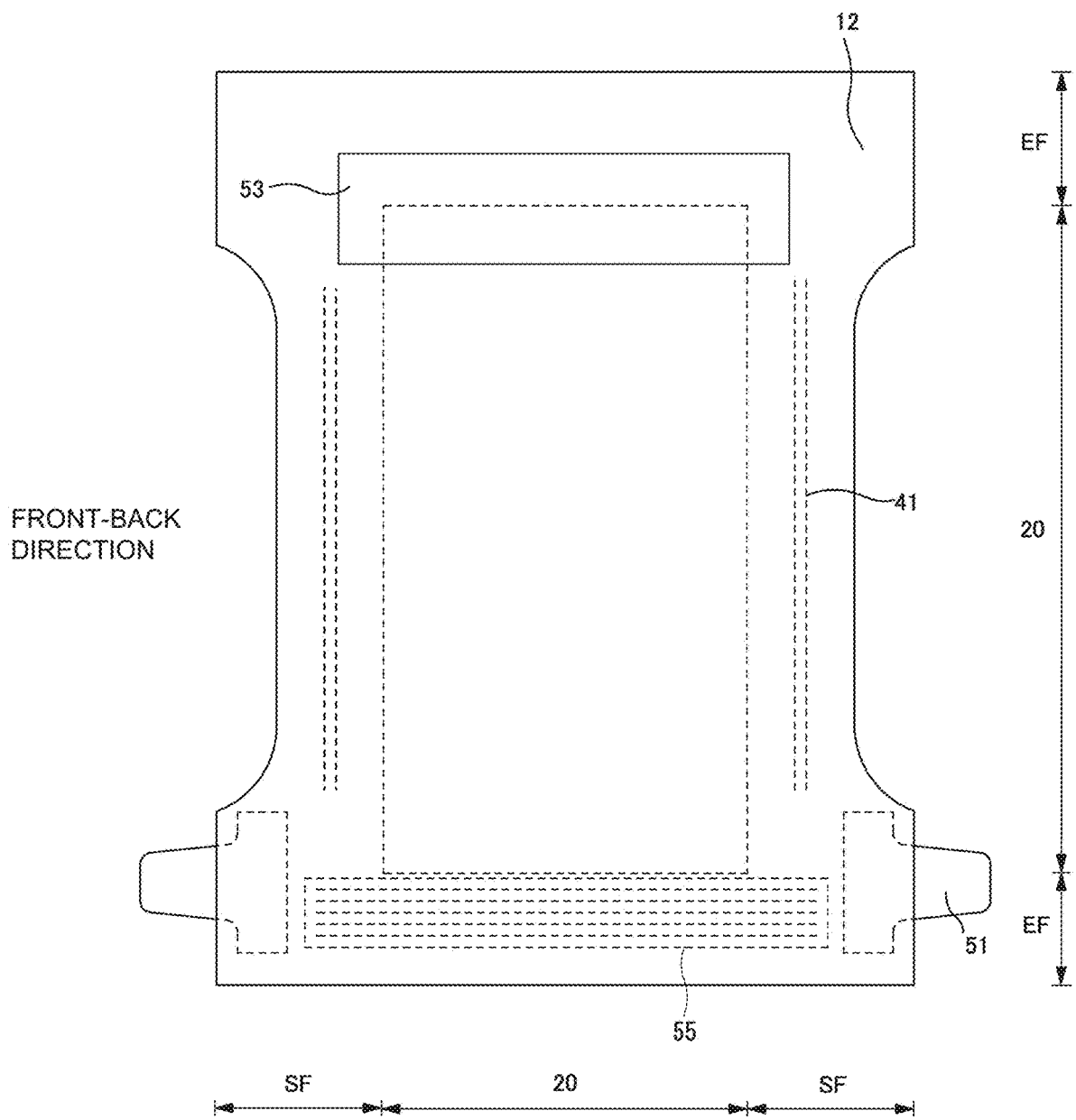

[FIG.15]
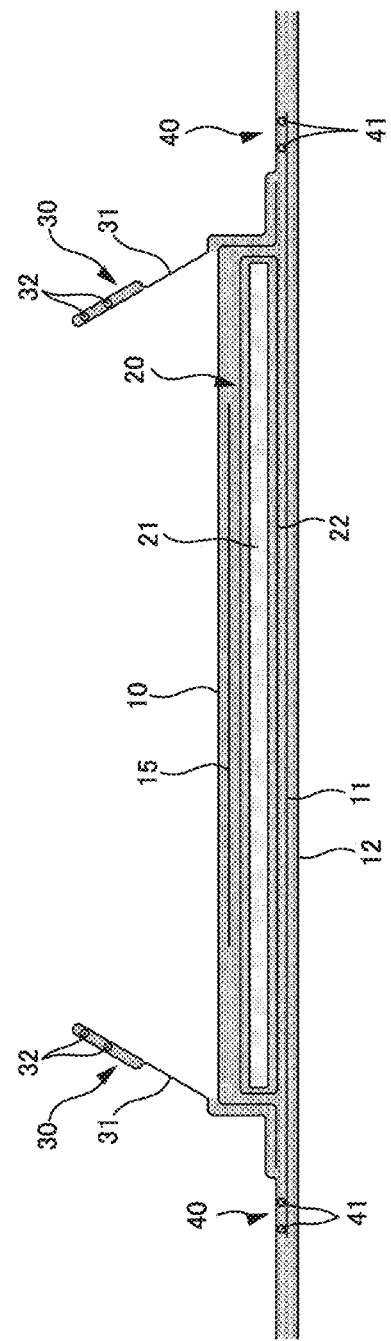

APPARATUS FOR ASSESSING PERFORMANCE OF ABSORBENT ARTICLES

CROSS-REFERENCE TO RELATED APPLICATIONS

This application is the U.S. national stage application of International Application PCT/JP2021/030568, filed Aug. 20, 2021, which international application was published on Mar. 17, 2022, as International Publication WO 2022/054539 in the Japanese language. The International Application claims priority of Japanese Patent Application No. 2020-153576, filed Sep. 14, 2020. The international application and Japanese application are both incorporated herein by reference, in entirety.

TECHNICAL FIELD

The present invention relates to apparatus for assessing performance of absorbent articles, in particular, apparatus for assessing performance of absorbent articles, which determines, with high accuracy, the state of diffusion of bodily waste discharged on the top sheet of an absorbent article, absorption capacity of an absorbent article, and the position where the bodily waste spills outside.

BACKGROUND ART

Apparatus for assessing performance of absorbent articles has been disclosed, in which an absorbent article is held between an inner mount in a hemispherical shape and an outer mount in a hemispherical shape which is larger in size than the inner mount, to determine performance of the absorbent article (Patent Publication 1).

PRIOR ART PUBLICATION

Patent Publication

Patent Publication 1: JP 2018-183491 A

SUMMARY OF THE INVENTION

Problems to be Solved by the Invention

The assessment of the performance determined using the apparatus for assessing performance disclosed in Patent Publication 1 could be different from the assessment of performance of the absorbent article on a wearer, as the external contour of the inner mount is profoundly different from the figures of the abdomen and the hips of the wearer.

It is therefore an object of the present invention to provide apparatus for assessing performance of absorbent articles which offers assessment of performance, such as absorption capacity, of an absorbent article approximating to the assessment of performance of an absorbent article conducted with the absorbent article worn by a wearer.

Means for Solving the Problem

Means for solving the above problem are as follows.

The first means is apparatus for assessing performance of an absorbent article, the apparatus including a mount including an inner mount part for bearing a body-facing surface of an absorbent article and an outer mount part for bearing a surface of the absorbent article opposite from the body-facing surface, and a cradle for supporting the mount, wherein the inner mount part is formed of a transparent resin which allows visual observation from inside to outside the inner mount part, and the outer mount part is formed of a transparent resin which allows visual observation from outside to inside the outer mount part, and wherein an external contour of the inner mount part represents figures of abdomen and hips of a wearer, and an internal contour of the outer mount part represents figures of the abdomen and the hips of the wearer and is larger in size than the external contour of the inner mount part.

The second means is the apparatus according to the first means, further including:

as seen from above, in a middle in a width direction of the internal contour of the inner mount part, a dorsal buttress extending forward from a back portion of the inner contour and a ventral buttress extending backward from a front portion of the inner contour, wherein, as seen from side, a defecation port is formed in the dorsal buttress at a position corresponding to an anus of the wearer, and a urethral port is formed in the ventral buttress at a position corresponding to a urethral orifice of the wearer.

The third means is the apparatus according to the second means, wherein the urethral port includes a male urethral port located corresponding to a urethral orifice of a male wearer, and a female urethral port located corresponding to a urethral orifice of a female wearer.

The fourth means is the apparatus according to any one of the first to third means, wherein the cradle includes a base plate, a pair of side plates provided in lateral portions opposed in the width direction of the base plate, an arm for bearing an external surface of the mount, a pivot shaft extending in the width direction to support a lower portion of the arm, and a bearing member for rotatably bearing the pivot shaft, wherein the cradle is configured, as seen from left side, to change an angle formed between a first virtual line extending in a top-bottom direction of the mount and a second virtual line extending in a front-back direction of the pivot shaft from 90 degrees to 30 degrees through counterclockwise rotation of the pivot shaft, and to change the angle formed between the first virtual line extending in the top-bottom direction of the mount and the second virtual line extending in the front-back direction of the pivot shaft from 90 degrees to 30 degrees through clockwise rotation of the pivot shaft.

The fifth means is the apparatus according to the fourth means, wherein the angle formed between the first virtual line and the second virtual line is held by inserting a supporting shaft extending in the width direction, through a pair of first apertures formed in the side plates and a second aperture formed in the arm.

The sixth means is the apparatus according to any one of the first to fifth means, further having a loading member to be mounted on an upper end of the inner mount part to apply a load onto the inner mount part.

Effect of the Invention

According to the first means, the inner mount part is formed of a transparent resin which allows visual observation from inside to outside the inner mount part, and the outer mount part is formed of a transparent resin which allows visual observation from outside to inside the outer mount part, the external contour of the inner mount part represents the figures of abdomen and hips of a wearer, and the internal contour of the outer mount part represents the figures of the abdomen and the hips of the wearer and is larger in size than the external contour of the inner mount part. Accordingly, a disposable diaper may be borne on the outer contour of the inner mount part closely resembling the state where the disposable diaper is worn by a wearer, which allows assessment of performance, such as absorption capacity, of the disposable diaper, approximating to the assessment with the disposable diaper worn by a wearer. Further, state of diffusion of bodily waste discharged onto a disposable diaper, location of leakage of bodily waste, and the like, may easily be observed through the inner contour of the inner mount part and through the outer contour of the outer mount part.

According to the second means, as seen from above, in the middle in the width direction of the internal contour of the inner mount part, a dorsal buttress extending forward from a back portion of the inner contour and a ventral buttress extending backward from a front portion of the inner contour are provided, and, as seen from side, a defecation port formed in the dorsal buttress at a position corresponding to the anus of the wearer, and a urethral port formed in the ventral buttress at a position corresponding to the urethral orifice of the wearer are provided. Accordingly, in addition to the effect from the first means, by discharging artificial feces through the defecation port and artificial urea through the urethral port onto a disposable diaper, performance of the disposable diaper, such as absorption capacity, may be assessed with high accuracy.

According to the third means, the urethral port includes a male urethral port located corresponding to the urethral orifice of a male wearer, and a female urethral port located corresponding to the urethral orifice of a female wearer. Accordingly, in addition to the effect from the second means, by discharging artificial urea through the male urethral port and the female urethral port onto a disposable diaper, performance of the disposable diaper, such as absorption capacity, may be assessed with higher accuracy.

According to the fourth means, the cradle has a base plate, a pair of side plates provided in the lateral portions opposed in the width direction of the base plate, an arm for bearing the external surface of the mount, a pivot shaft extending in the width direction to support a lower portion of the arm, and a bearing member for rotatably bearing the pivot shaft, and the cradle is configured, as seen from left side, to change an angle formed between a first virtual line extending in the top-bottom direction of the mount and a second virtual line extending in the front-back direction of the pivot shaft from 90 degrees to 30 degrees through counterclockwise rotation of the pivot shaft, and to change the angle formed between the first virtual line extending in the top-bottom direction of the mount and the second virtual line extending in the front-back direction of the pivot shaft from 90 degrees to 30 degrees through clockwise rotation of the pivot shaft. Accordingly, in addition to the effect from any one of the first to third means, performance, such as absorption capacity, of a disposable diaper as if worn by a wearer in the upright position, the prone position, and the supine position, may be assessed.

According to the fifth means, the angle formed between the first virtual line and the second virtual line is held by inserting a supporting shaft extending in the width direction, through a pair of first apertures formed in the side plates and a second aperture formed in the arm. Accordingly, in addition to the effect from the fourth means, performance, such as absorption capacity, of disposable diapers as if worn by a wearer in the upright position, the prone position, and the supine position, may be assessed with high accuracy.

According to the sixth means, a loading member to be mounted on the upper end of the inner mount part to apply a load onto the inner mount part is provided. Accordingly, in addition to the effect from any one of the first to fifth means, performance, such as absorption capacity, of a disposable diaper as if worn by a wearer in the sitting position under a certain body weight, may be assessed.

BRIEF DESCRIPTION OF THE DRAWINGS

FIG. 7 is a perspective view of a cradle on which the mount for bearing a disposable diaper is installed.

FIG. 8 is a perspective view of a loading member for applying a predetermined load onto the inner mount part of the mount bearing a disposable diaper.

FIG. 9 illustrates the assessment of performance of a disposable diaper in an upright position of a wearer.

FIG. 10 illustrates the assessment of performance of a disposable diaper in a prone position of a wearer.

FIG. 11 illustrates the assessment of performance of a disposable diaper in a supine position of a wearer.

FIG. 12 illustrates the assessment of performance of a disposable diaper in a sitting position of a wearer.

FIG. 13 is a plan view of a disposable diaper illustrating its body-facing surface.

FIG. 14 is a plan view of the disposable diaper illustrating a surface opposite from the body-facing surface.

FIG. 15 is a cross-sectional view taken along lines Z-Z in FIG. 13.

<Apparatus for Assessing Performance of Disposable Diapers>

Figure 1:
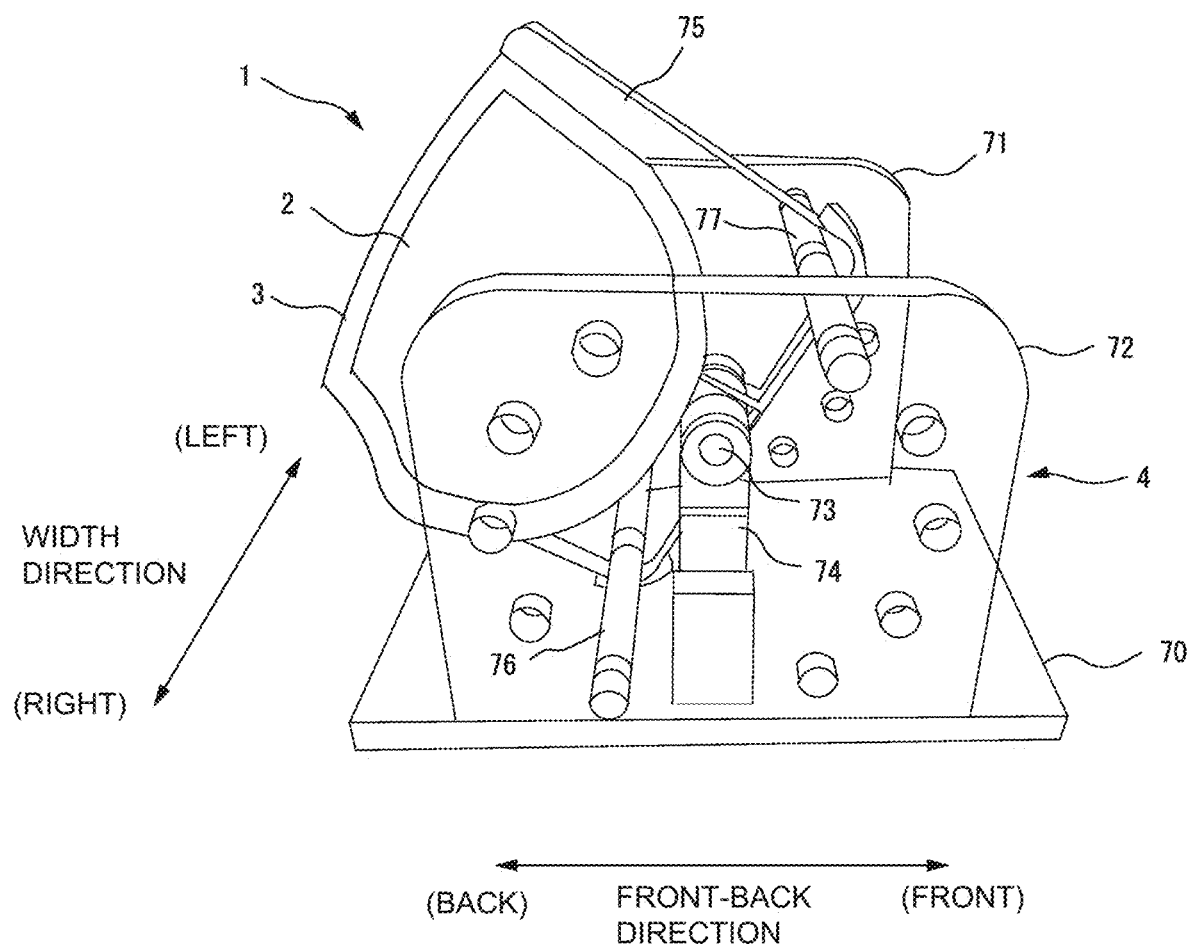
FIG. 1 is a perspective view of apparatus for assessing performance of disposable diapers.

As shown in FIG. 1, the apparatus for assessing performance of disposable diapers is composed of a mount 1 for bearing a disposable diaper and a cradle 4 for supporting the mount 1.

The mount 1 is composed of an inner mount part 2 having an external contour formed in conformity with the figures of the abdomen including the groin and the hips including the buttocks of an infant, who is a wearer, and an outer mount part 3 having an inner contour formed in conformity with and larger in size for predetermined dimensions than the external contour of the inner mount part 2.

For assessing performance of a disposable diaper borne on the mount 1 under a predetermined load, a loading member 5 as shown in FIG. 8 is provided for applying a predetermined load onto the upper end of the inner mount part 2.

<Inner Mount Part>

Figure 2:
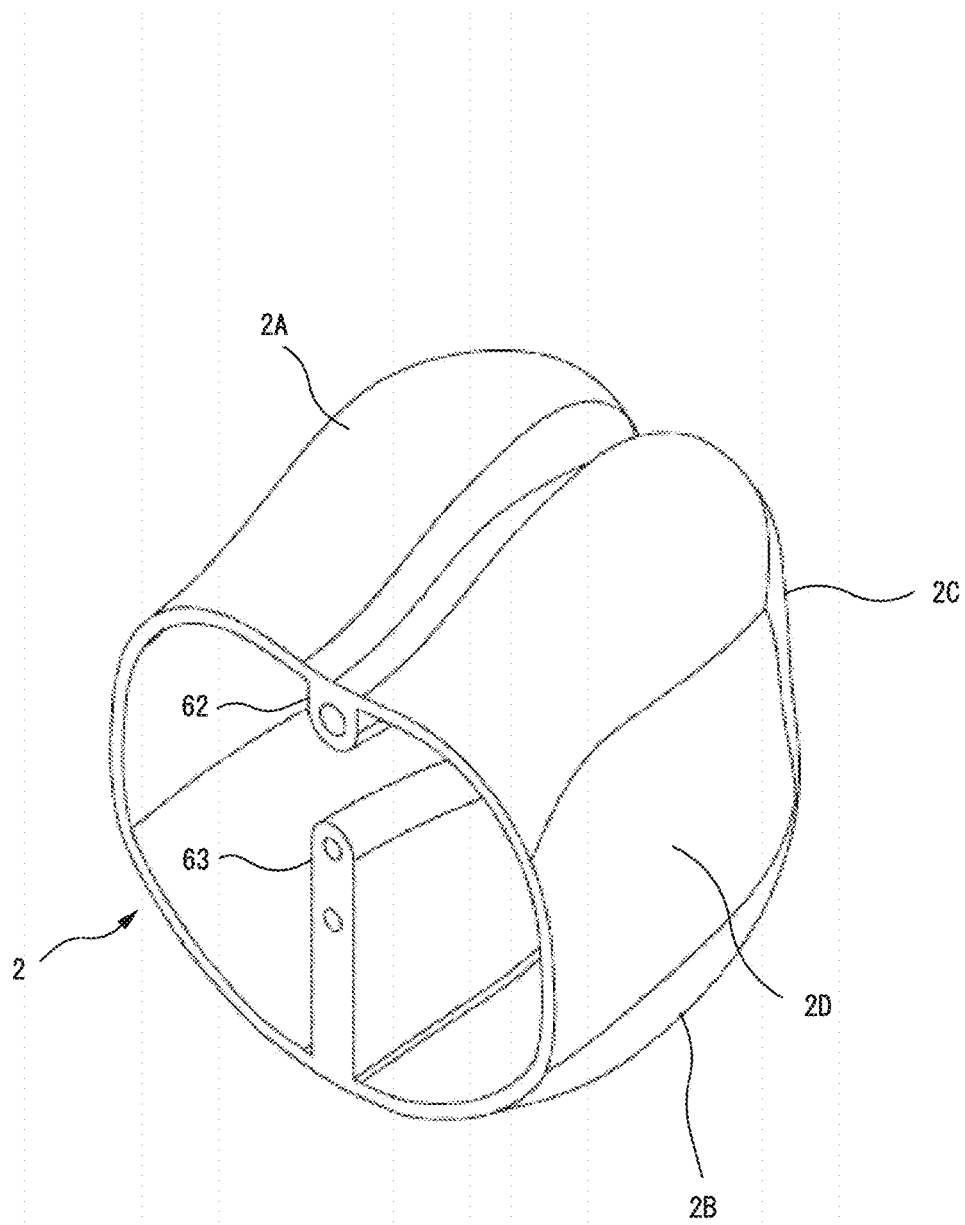
FIG. 2 is a perspective view of an inner mount part of a mount for bearing a disposable diaper.
Figure 3:
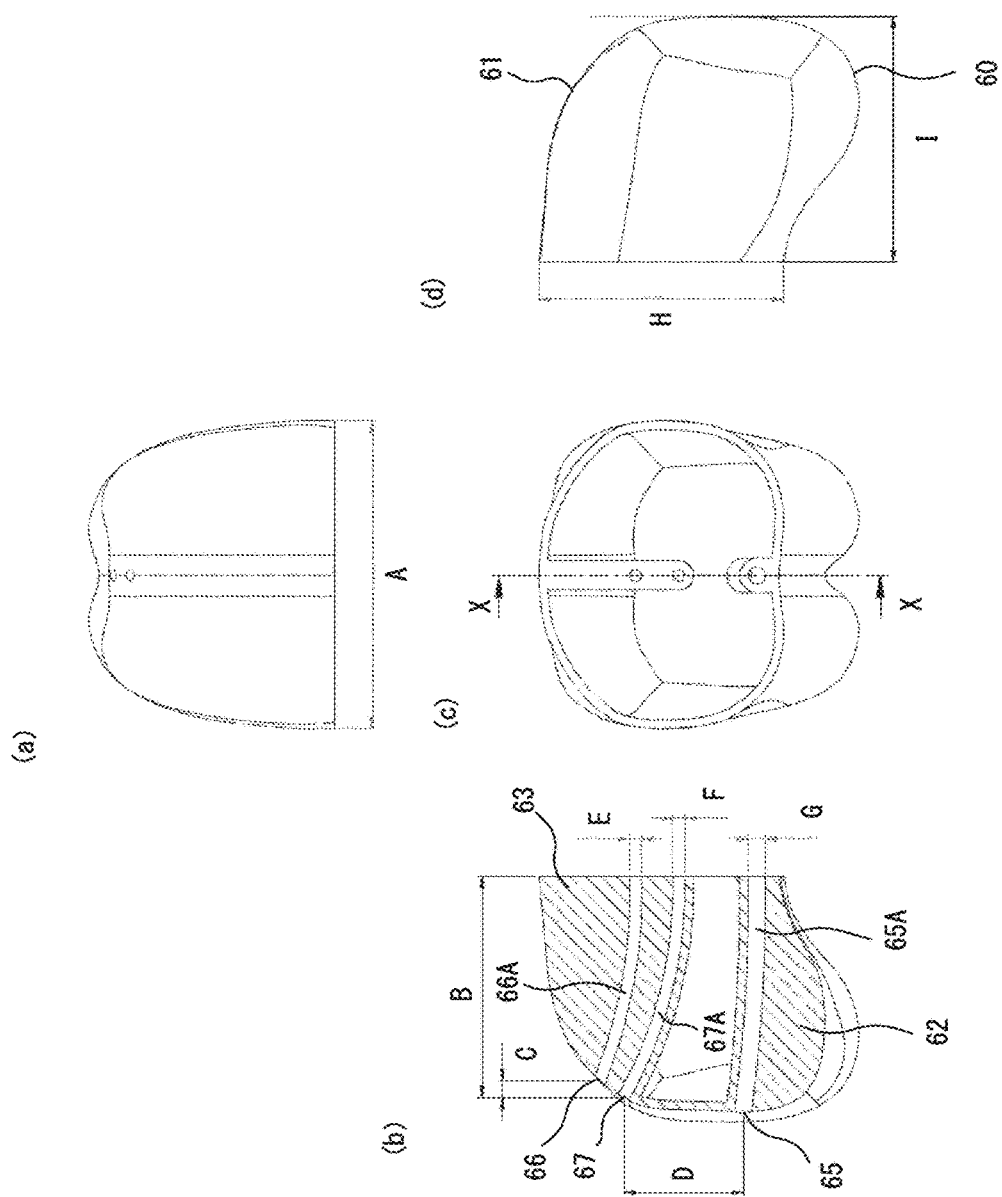
FIG. 3(a) is a front view of the inner mount part.
FIG. 3(b) is a sectional view thereof taken along lines X-X in FIG. 3(c)
FIG. 3(c) is a plan view thereof.
FIG. 3(d) is a right side view thereof.

As shown in FIGS. 2 and 3, the inner mount part 2 is formed of a transparent resin and having a predetermined thickness. This allows observation, through the internal contour of the inner mount part 2, of diffusing state or the like of artificial urea or the like discharged onto a disposable diaper.

The external contour of the inner mount part 2 has a dorsal section 2A formed in conformity with the hips of a wearer, a ventral section 2B formed in conformity with the abdomen, a crotch section 2C formed in conformity with the crotch, and a pair of right and left lateral sections 2D formed in conformity with the lateral portions on both sides of the body. Further, in the lower part of the dorsal section 2A, buttocks portions 60 extending backwards are formed, whereas in the lower part of the ventral section 2B, a curved portion 61 convexing forward is formed. In this way, a disposable diaper may be borne on the inner mount part 2 closely resembling the state where the disposable diaper is worn by a wearer, which allows assessment of performance, such as absorption capacity, of the disposable diaper, approximating to the assessment with the disposable diaper worn by a wearer.

As seen from side, on the internal contour of the dorsal section 2A in the middle of its width, a dorsal buttress 62 is formed extending in the top-bottom direction with a predetermined extent from the internal contour, while the lower part of the dorsal buttress 62 connects to the internal contour of the back part of the crotch section 2C.

As seen from side, on the internal contour of the ventral section 2B in the middle of its width, a ventral buttress 63 is formed extending in the top-bottom direction with a predetermined extent from the internal contour, while the lower part of the ventral buttress 63 connects to the internal contour of the front part of the crotch section 2C.

A seen from side, in the back part of the crotch section 2C in the middle of its width, a defecation port 65 is formed at a position corresponding to the anus of a wearer, in the front part of the crotch section, a male urethral port 66 is formed at a position corresponding to the urethral orifice of a male wearer, and on the back of the male urethral port 66 a female urethral port 67 is formed at a position corresponding to the urethral orifice of a female wearer. Further, the dorsal buttress 62 is provided with a fecal line 65A communicating with the defecation port 65, whereas the ventral buttress 63 is provided with a male urethral line 66A communicating with the male urethral port 66 and a female urethral line 67A communicating with the female urethral port 67. In this way, artificial feces is discharged through the fecal line 65A out of the defecation port 65, artificial urea is discharged through the male urethral line 66A out of the male urethral port 66, and artificial urea is discharged through the female urethral line 67A out of the female urethral port 67, onto a disposable diaper to determine the total amount of absorption capable of absorption by the disposable diaper, the amount of absorption in each area of the disposable diaper, the location of leakage of the artificial urea or the like, and the like, which allows prediction with high accuracy of the total amount of absorption capable of absorption by a disposable diaper, the amount of absorption in each area of the disposable diaper, and the location of leakage of artificial urea or the like, and the like, when the disposable diaper is worn by a wearer. As used herein, the male urethral port 66 and the female urethral port 67 are collectively referred to as the urethral port.

Note that in the apparatus for assessing performance of disposable diapers for infants weighing 12 to 20 kg according to the present embodiment, dimension A shown in FIG. 3 is 180 mm, dimension B is 130 mm, dimension C is 10 mm, dimension D is 70 mm, dimension E is 7 mm in diameter, dimension F is 7 mm in diameter, dimension G is 10 mm in diameter, dimension H is 144 mm, and dimension I is 144 mm.

<Outer Mount Part>

Figure 4:
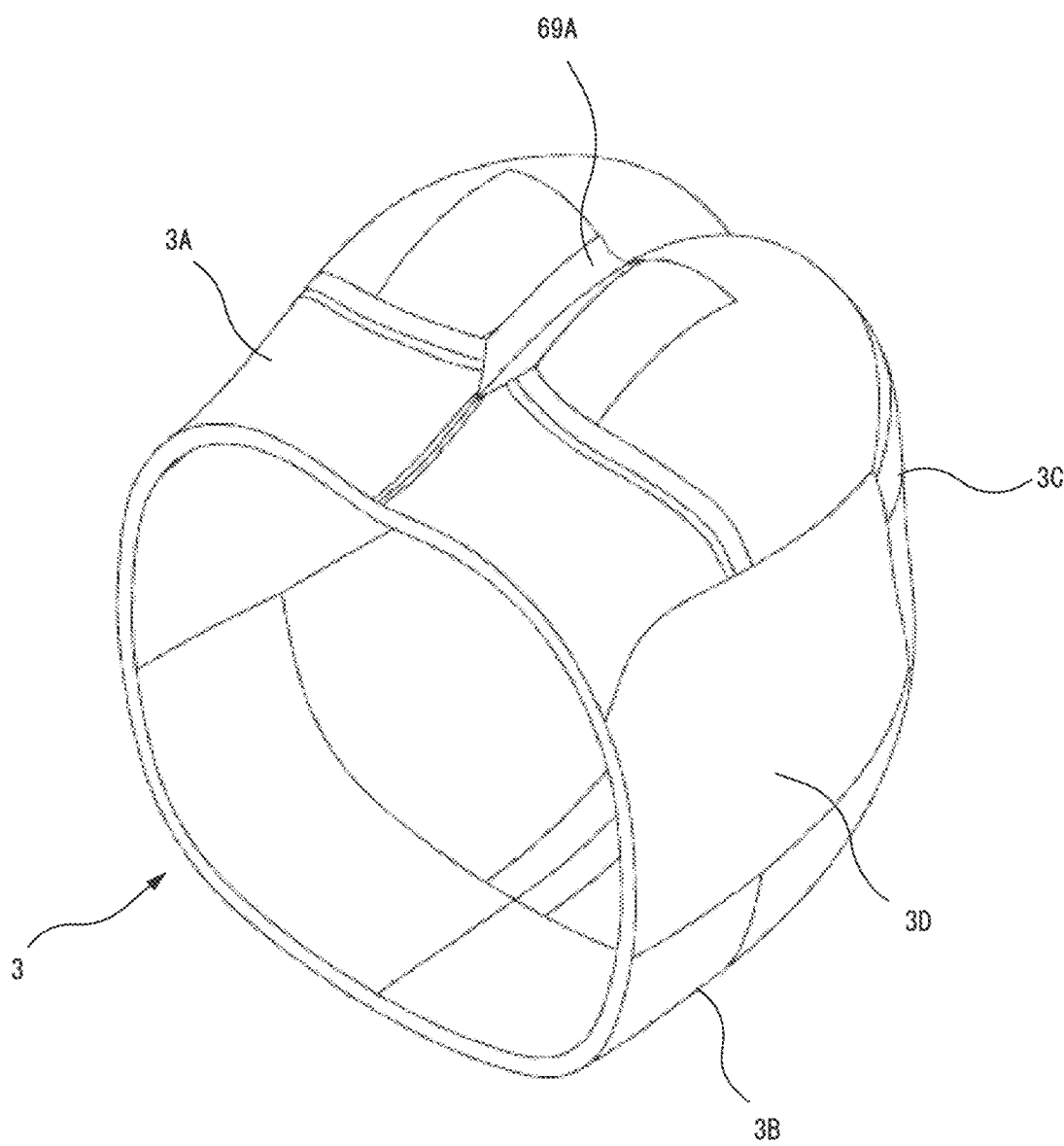
FIG. 4 is a perspective view of an outer mount part of the mount for bearing a disposable diaper.
Figure 5:
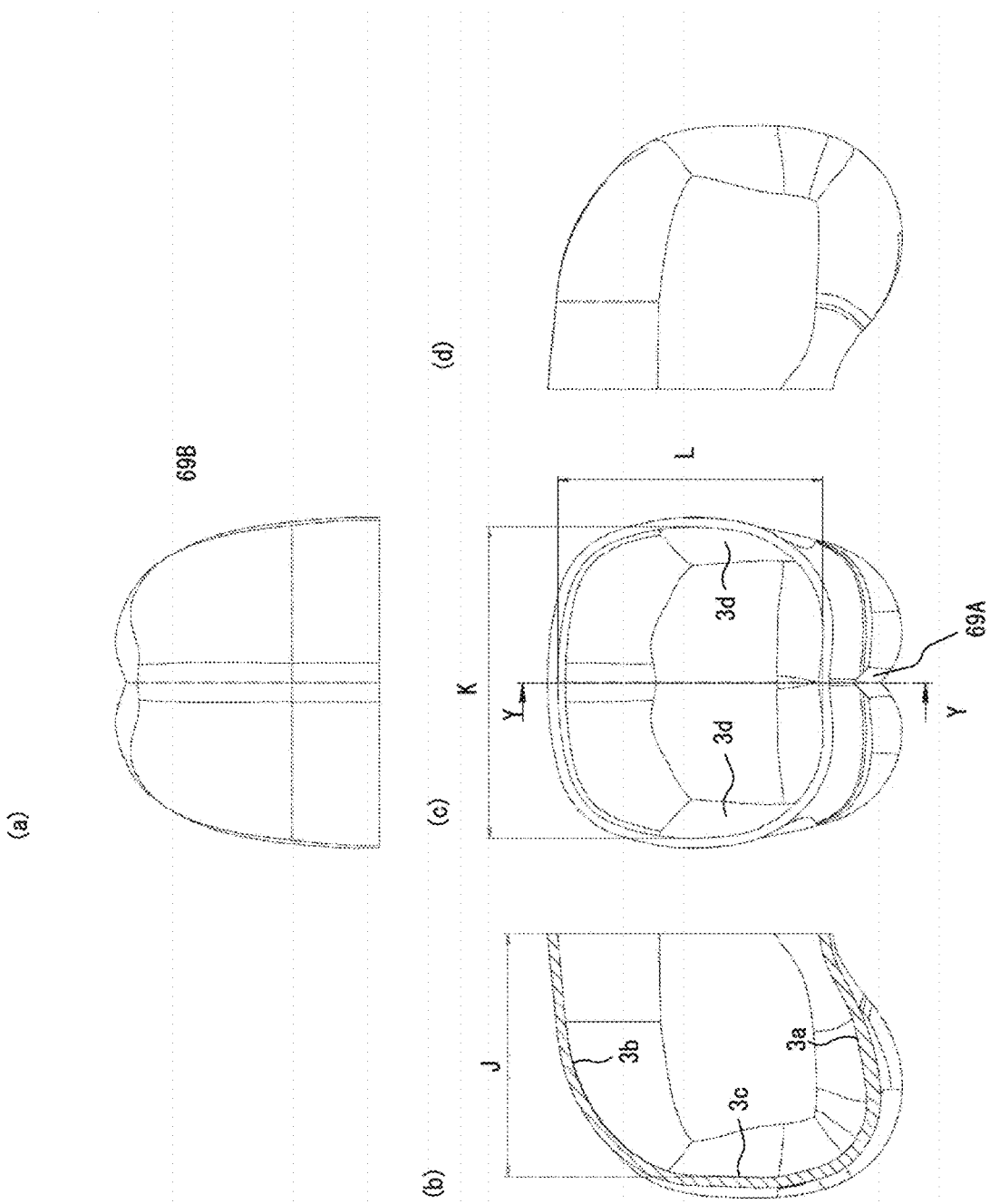
FIG. 5(a) is a front view of the inner mount part.
FIG. 5(b) is a sectional view thereof taken along lines Y-Y in FIG. 5(c)
FIG. 5(c) is a plan view thereof.
FIG. 5(d) is a right side view thereof.

As shown in FIGS. 4 and 5, the outer mount part 3 is formed of a transparent resin and having a predetermined thickness. This allows observation, through the external contour of the outer mount part 3, of leakage or the like of artificial urea or the like discharged onto a disposable diaper.

Figure 6:
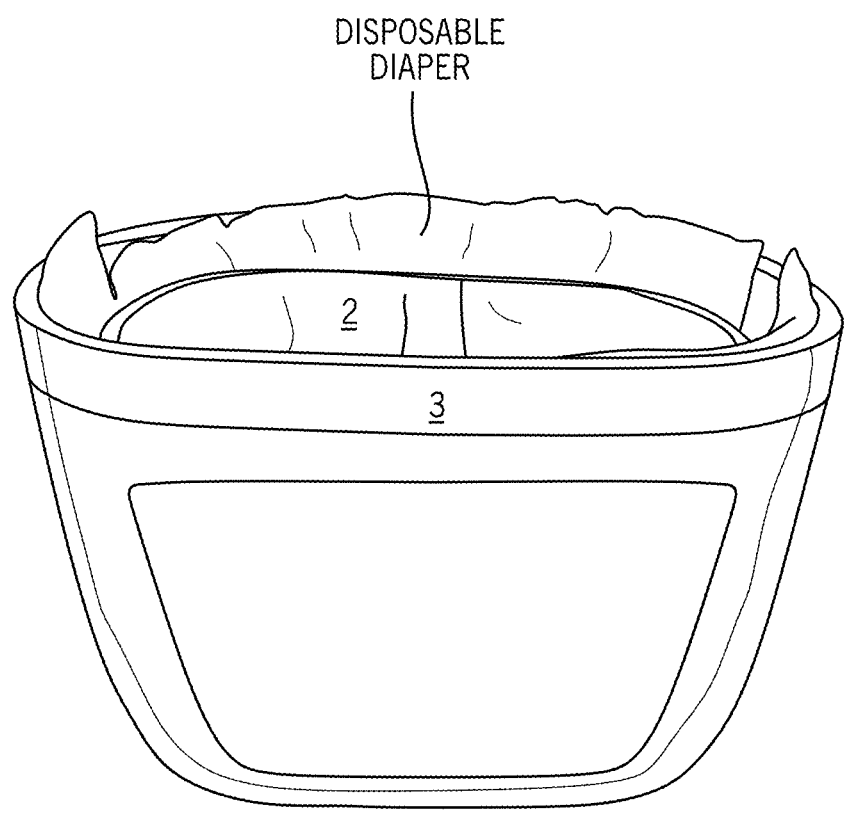
FIG. 6 is a front view of the mount bearing a disposable diaper between the inner and outer mount parts thereof.

The internal contour of the outer mount part 3 is formed in conformity with and at a predetermined distance from the external contour of the inner mount part 2. That is, the internal contour of the outer mount part 3 has a dorsal section 3a formed in conformity with and at a predetermined distance from the dorsal section 2A of the inner mount part 2, a ventral section 3b formed in conformity with and at a predetermined distance from the ventral section 2B, a crotch section 3c formed in conformity with and at a predetermined distance from the crotch section 2C, and a pair of right and left lateral sections 3d formed in conformity with and at a predetermined distance from the pair of right and left lateral sections 2D. In this way, as shown in FIG. 6, a disposable diaper is interposed in the gap between the external contour of the inner mount part 2 and the internal contour of the outer mount part 3, and borne between the external contour of the inner mount part 2 and the internal contour of the outer mount part 3 as if the disposable diaper is worn by a wearer.

The external contour of the outer mount part 3, like the internal contour thereof, has a dorsal section 3A formed in conformity with and at a predetermined distance from the dorsal section 2A of the inner mount part 2, a ventral section 3B formed in conformity with and at a predetermined distance from the dorsal section 2B, a crotch section 3C formed in conformity with and at a predetermined distance from the crotch section 2C, and a pair of right and left lateral sections 3D formed in conformity with and at a predetermined distance from the pair of right and left lateral sections 2D.

The dorsal section 3A of the outer mount part 3 is provided, in the middle of the width direction in the middle of the top-bottom direction thereof, with a groove 69A extending in the top-bottom direction, whereas the ventral section 3B is provided, in the middle of the width direction thereof, with a groove 69B extending in the top-bottom direction. In this way, by pressing down the outer mount part 3 with respect to the arm 75 of the cradle 4, the grooves 69A, 69B of the outer mount part 3 may engage the inner periphery of the arm 75. On the other hand, by pushing up the outer mount part 3 with respect to the arm 75 of the cradle 4, the engagement between the inner periphery of the arm and the grooves 69A, 69B of the outer mount part 3 may easily be released. As used herein, the groove 69A and the groove 69B are collectively referred to as the grooves 69.

Note that in the apparatus for assessing performance of disposable diapers for infants weighing 12 to 20 kg according to the present embodiment, dimension J shown in FIG. 5 is 160 mm, dimension K is 205 mm, and dimension L is 174 mm.

<Cradle>

As shown in FIG. 7, the cradle 4 is composed of a rectangular base plate 70 having a predetermined thickness, a left side plate 71 and a right side plate 72 (the pair of side plates in the claims) provided on the top face of the base plate 70 in the lateral portions thereof opposed in the width direction, a pivot shaft 73 extending in the width direction and provided above the top face of the base plate 70 in the middle of the front-back direction and in the middle of the width direction thereof, a bearing member 74 rotatably bearing the pivot shaft 73 on both ends in the width direction, and an arm 75 fixed on the pivot shaft 73 in the middle of the width direction and engages in the grooves 69 on the outer mount part 3.

As seen from the left side, the left side plate 71 is provided with ten apertures 81 (the first apertures in the claims) formed along a circle having a certain radius around the shaft center of the pivot shaft 73, through two of which apertures a back supporting shaft 76 (the supporting shaft in the claims) and a front supporting shaft 77 (the supporting shaft in the claims), both extending in the width direction, are inserted in their left end portions, for holding the angle of rotation of the arm 75 pivoted with the pivot shaft 73.

In the left side plate 71, the apertures 81 formed backward of the pivot shaft 73 are, in order from the top, a first back aperture 81 formed at 30 degrees clockwise, a second back aperture 81 formed at 60 degrees clockwise, a third back aperture 81 formed at 90 degrees clockwise, a fourth back aperture 81 formed at 120 degrees clockwise, and a fifth back aperture 81 formed at 150 degrees clockwise.

In the left side plate 71, the apertures 81 formed forward of the pivot shaft 73 are, in order from the top, a first front aperture 81 formed at 30 degrees counterclockwise, a second front aperture 81 formed at 60 degrees counterclockwise, a third front aperture 81 formed at 90 degrees counterclockwise, a fourth front aperture 81 formed at 120 degrees counterclockwise, and a fifth front aperture 81 formed at 150 degrees counterclockwise.

As seen from the right side, the right side plate 72 (the side plate in the claims) is provided with ten apertures 82 formed along a circle having a certain radius around the shaft center of the pivot shaft 73, through two of which apertures the back supporting shaft 76 and the front supporting shaft 77, both extending in the width direction, are inserted in their right end portions, for holding the angle of rotation of the arm 75 pivoted with the pivot shaft 73.

In the right side plate 72, the apertures 82 (the first apertures in the claims) formed backward of the pivot shaft 73 are, in order from the top, a first back aperture 82 formed at 30 degrees clockwise, a second back aperture 82 formed at 60 degrees clockwise, a third back aperture 82 formed at 90 degrees clockwise, a fourth back aperture 82 formed at 120 degrees clockwise, and a fifth back aperture 82 formed at 150 degrees clockwise.

In the right side plate 72, the apertures 82 formed forward of the pivot shaft 73 are, in order from the top, a first front aperture 82 formed at 30 degrees counterclockwise, a second front aperture 82 formed at 60 degrees counterclockwise, a third front aperture 82 formed at 90 degrees counterclockwise, a fourth front aperture 82 formed at 120 degrees counterclockwise, and a fifth front aperture 82 formed at 150 degrees counterclockwise.

In this way, as seen from the left side, by rotating the pivot shaft 73 counterclockwise, the mount 1 engaging the arm 75 may be moved from the sitting position to the prone position at 30-degree pitch in the circumferential direction, and by rotating the pivot shaft 73 clockwise, the mount 1 engaging the arm 75 may be moved from the sitting position to the supine position at 30-degree pitch in the circumferential direction. Note that, according to the present embodiment, the apertures 81 in the left side plate 71 and the apertures 82 in the right side plate 72 are formed at 30-degree pitch in the circumferential direction, but may be formed at 15-degree pitch.

As seen from the left side, the areas of the top face of the base plate 70 and the right face of the left side plate 71 facing to the pivot shaft 73 are linked with a reinforcing plate 83, whereas the areas of the top face of the base plate 70 and the left face of the right side plate 72 facing the pivot shaft 73 are linked with a reinforcing plate 84. In this way, rigidity of the left side plate 71 and the right side plate 72 may be enhanced to prevent deformation thereof.

As seen from the left side, the internal contour of the arm 75 is formed in conformity with the external contour of the outer mount part 3, and the back portion and the front portion of the internal contour of the arm 75 are formed in conformity with the grooves 69 on the outer mount part 3. In this way, the outer mount part 3 is easily attached to and detached from the arm 75, and interference between the crotch section 3C of the outer mount part 3 and the lower part of the arm 75 may be avoided.

The internal contour of the arm 75 in its upper front portion is provided with a cushioning member 85, such as of urethane. In this way, the outer mount part 3 may be positioned in close engagement with the arm 75, which allows minimization of the measurement errors in the assessment of performance of disposable diapers. In the back of the lower part of the arm 75, an aperture 75A (the second aperture in the claims) is formed, whereas in the front of the lower part of the arm 75, an aperture 75B (the second aperture in the claims) is formed.

The back supporting shaft 76, which is inserted through one of the apertures 81 in the left side plate 71, the aperture 75A in the arm 75, and the corresponding aperture 82 in the right side plate 72, is provided on its ends in the width direction with back stoppers 86, such as nuts. In this way, the back supporting shaft 76 may be kept from being slipped off of the aperture 81 in the left side plate 71 and the aperture 82 in the right side plate 72 during measurement for assessment of performance of disposable diapers.

The front supporting shaft 77, which is inserted through one of the apertures 81 in the left side plate 71, the aperture 75B in the arm 75, and the corresponding aperture 82 in the right side plate 72, is provided on its ends in the width direction with front stoppers 87, such as nuts. In this way, the front supporting shaft 77 may be kept from being slipped off of the aperture 81 in the left side plate 71 and the aperture 82 in the right side plate 72 during measurement for assessment of performance of disposable diapers.

<Loading Member>

As shown in FIG. 8, the loading member 5 is composed of a bottom plate 90 to be mounted on the upper end of the inner mount part 2, two legs 91 extending in the top-bottom direction from the top face of the bottom plate 90, and a rectangular top plate 92 fixed to the upper ends of the legs 91.

As seen from above, the peripheral shape of the bottom plate 90 is generally identical with the shape of the upper end of the inner mount part 2. In this way, the upper end of the inner mount part 2 may be loaded evenly.

In the middle in the front-back direction and in the middle in the width direction of the top plate 92 is formed a rectangular recess 93 in which a weight is to be placed. This keeps the weight from being slipped off during measurement for assessment of performance of disposable diapers, which allows safe measurement for the assessment of performance of disposable diapers.

<Method for Assessment of Performance of Disposable Diapers>

Next, a method for assessment of performance of disposable diapers is explained. Postures of a wearer of a disposable diaper may generally be classified into an upright position for walking, a prone position for sleeping prone, a supine position for sleeping supine, and a sitting position for sitting on a chair or the like.

Even with the same amount of urine discharged, performance of a disposable diaper, such as the state of diffusion of the urea and the like discharged onto the top sheet 10 of the disposable diaper, absorption capacity of the absorbent body 21, and location of leakage to the outside, may differ among the upright position, the prone position, the supine position, and the sitting position, and those in the art are desirous of determination of performance, such as the state of diffusion of urea and the like, with high accuracy for each of the upright position, the prone position, the supine position, and the sitting position.

<Method for Assessment of Performance of Disposable Diapers in Upright Position>

As shown in FIG. 9, a disposable diaper is borne between the inner mount part 2 and the outer mount part 3, and the mount 1 bearing the disposable diaper is engaged on the arm 75 of the cradle 4. For facilitating understanding, the left side plate 71 is omitted in FIG. 9.

Next, the outer mount part 3 is moved, by pivoting the pivot shaft 73, into a position where a first virtual line L1 extending in the top-bottom direction and orthogonally to the upper end face of the outer mount part 3 is at right angles to a second virtual line L2 extending in the front-back direction passing the shaft center of the pivot shaft 73.

Next, the back supporting shaft 76 is inserted through the third back aperture 81 in the left side plate 71, the aperture 75A in the arm 75, and the third back aperture 82 in the right side plate 72, whereas the front supporting shaft 77 is inserted through the third front aperture 81 in the left side plate 71, the aperture 75B in the arm 75, and the third front aperture 82 in the right side plate 72.

In this way, the disposable diaper borne on the mount 1 may be held at a position where the top-bottom direction of the disposable diaper is at right angle to the second virtual line L2, which allows assessment of performance of the disposable diaper, such as the state of diffusion of urea, absorption capacity, and location of leakage, in the upright position with high accuracy. Note that, when the wearer is in the upright position, the top-bottom direction of the disposable diaper worn by the wearer is at right angles to the horizontal line, which is substantially identical with the second virtual line L2.

<Method for Assessment of Performance of Disposable Diapers in Prone Position>

As shown in FIG. 10, a disposable diaper is borne between the inner mount part 2 and the outer mount part 3, and the mount 1 bearing the disposable diaper is engaged on the arm 75 of the cradle 4. For facilitating understanding, the left side plate 71 is omitted in FIG. 10.

Next, the outer mount part 3 is moved, by pivoting the pivot shaft 73 counterclockwise, into a position where the first virtual line L1 extending in the top-bottom direction and orthogonally to the upper end face of the outer mount part 3 and the second virtual line L2 extending in the front-back direction passing the shaft center of the pivot shaft 73 form an angle of 30 degrees therebetween.

Next, the back supporting shaft 76 is inserted through the first back aperture 81 in the left side plate 71, the aperture 75A in the arm 75, and the first back aperture 82 in the right side plate 72, whereas the front supporting shaft 77 is inserted through the fifth front aperture 81 in the left side plate 71, the aperture 75B in the arm 75, and the fifth front aperture 82 in the right side plate 72.

In this way, the disposable diaper borne on the mount 1 may be held at a position where the top-bottom direction of the disposable diaper and the second virtual line L2 form an angle of 30 degrees therebetween, which allows assessment of performance of the disposable diaper, such as the state of diffusion of urea, absorption capacity, and location of leakage, in the prone position with high accuracy. Note that, when the wearer is in the prone position, the top-bottom direction of the disposable diaper worn by the wearer and the horizontal line form an angle of 30 degrees therebetween.

<Method for Assessment of Performance of Disposable Diapers in Supine Position>

As shown in FIG. 11, a disposable diaper is borne between the inner mount part 2 and the outer mount part 3, and the mount 1 bearing the disposable diaper is engaged on the arm 75 of the cradle 4. For facilitating understanding, the left side plate 71 is omitted in FIG. 11.

Next, the outer mount part 3 is moved, by pivoting the pivot shaft 73 clockwise, into a position where the first virtual line L1 extending in the top-bottom direction and orthogonally to the upper end face of the outer mount part 3 and the second virtual line L2 extending in the front-back direction passing the shaft center of the pivot shaft 73 form an angle of 30 degrees therebetween.

Next, the back supporting shaft 76 is inserted through the fifth back aperture 81 in the left side plate 71, the aperture 75A in the arm 75, and the fifth back aperture 82 in the right side plate 72, whereas the front supporting shaft 77 is inserted through the first front aperture 81 in the left side plate 71, the aperture 75B in the arm 75, and the first front aperture 82 in the right side plate 72.

In this way, the disposable diaper borne on the mount 1 may be held at a position where the top-bottom direction of the disposable diaper and the second virtual line L2 form an angle of 30 degrees therebetween, which allows assessment of performance of the disposable diaper, such as the state of diffusion of urea, absorption capacity, and location of leakage, in the supine position with high accuracy. Note that, when the wearer is in the supine position, the top-bottom direction of the disposable diaper worn by the wearer and the horizontal line form an angle of 30 degrees therebetween.

<Method for Assessment of Performance of Disposable Diapers in Sitting Position>

As shown in FIG. 12, a disposable diaper is borne between the inner mount part 2 and the outer mount part 3, and the mount 1 bearing the disposable diaper is engaged on the arm 75 of the cradle 4. For facilitating understanding, the left side plate 71 is omitted in FIG. 12.

Next, the outer mount part 3 is moved, by pivoting the pivot shaft 73, into a position where the first virtual line L1 extending in the top-bottom direction and orthogonally to the upper end face of the outer mount part 3 is at right angles to the second virtual line L2 extending in the front-back direction passing the shaft center of the pivot shaft 73.

Next, the back supporting shaft 76 is inserted through the third back aperture 81 in the left side plate 71, the aperture 75A in the arm 75, and the third back aperture 82 in the right side plate 72, whereas the front supporting shaft 77 is inserted through the third front aperture 81 in the left side plate 71, the aperture 75B in the arm 75, and the third front aperture 82 in the right side plate 72.

Next, the bottom plate 90 of the loading member 5 is mounted on the upper end of the inner mount part 2, and then a weight corresponding to the load to be applied to the disposable diaper when worn, calculated from the body weight of the wearer, is placed in the recess 93 in the loading member 5.

In this way, the disposable diaper borne on the mount 1 may be held at a position where the top-bottom direction of the disposable diaper is at right angles to the second virtual line L2, which allows assessment of performance of the disposable diaper, such as the state of diffusion of urea, absorption capacity, and location of leakage, in the sitting position with high accuracy. Note that, when the wearer is in the sitting position, the top-bottom direction of the disposable diaper worn by the wearer is at right angles to the horizontal line, which is substantially identical with the second virtual line L2, and the largest load is applied to the disposable diaper worn by the wearer.

<Disposable Diaper>

Next, disposable diapers to be assessed using the apparatus for assessing performance of disposable diapers are discussed.

As shown in FIGS. 13 to 15, the disposable diaper is composed of a liquid-pervious top sheet 10 disposed on the body-facing side, a liquid-impervious back sheet 11 provided on the side opposite from the body-facing side, and an absorbent element 20 provided between the top sheet 10 and the back sheet 11. The absorbent element 20 is composed of an absorbent body 21 and a packing sheet 22 packing the absorbent body 21.

On the side of the back sheet 11 opposite from the body-facing side, an exterior sheet 12 is disposed. It is preferred to provide, between the top sheet 10 and the absorbent element 20, an intermediate sheet 15 which allows transfer of the bodily waste permeating through the top sheet 10 to the absorbent element 20 to keep the bodily waste from flowing back.

On the lateral portions opposed in the width direction of the absorbent element 20, at a predetermined distance therefrom a pair of three-dimensional gather parts 30 are provided for keeping bodily waste from leaking to the outside. Each three-dimensional gather part 30 is composed of a gathered sheet 31 substantially continuous in the width direction, and elongate elastic members 32 fixed in a stretched state along the gathered sheet 31 in the front-back direction.

Laterally outwards of the folded lines 30A of the pair of three-dimensional gather parts 30, at a predetermined distance therefrom a pair of planar gathers 40 are provided for keeping discharged urea from leaking to the outside. The planar gathers 40 are formed with the elongate elastic members 41 fixed in a stretched state along the front-back direction between the back sheet 11 and the gathered sheet 31.

In the opposed ends in the front-back direction of the absorbent element 20, a pair of end flaps EF is formed, while in the opposed sides in the width direction of the absorbent element 20, a pair of side flaps SF is formed.

On the side flaps SF on the opposed sides in the width direction in the dorsal section are provided a pair of fastening tapes 50. Each fastening tape 50 is composed of a base member 51 fixed to the side flap SF, and an engaging part 52 provided on the body-facing surface of the base member 51.

On the surface of the exterior sheet 12 opposite from the body-facing surface, a rectangular target sheet 53 is provided in the ventral section, which extends in the width direction with a predetermined extent in the front-back direction, and on which the engaging parts 52 of the fastening tapes 50 are to engage.

Between the top sheet 10 and the back sheet 11 forming the dorsal end flap EF, a stretchable sheet 55 to be discussed later is disposed.

Next, materials and features of the top sheet 10 or the like will now be explained in turn.

<Top Sheet>

The top sheet 10 is formed of perforated or imperforated nonwoven fabric, porous plastic sheet, or the like. Among these, nonwoven fabric is not particularly limited in its raw material fibers. For example, synthetic fibers, such as polyolefin-based including polyethylene or polypropylene, polyester-based, or polyamide-based fibers, recycled fibers, such as rayon or cupra, natural fibers, such as cotton, or mixed fibers or composite fibers of two or more of these may be used. Further, the nonwoven fabric may have been produced through any processing. The processing may include known processes, such as spunlacing, spunbonding, thermal bonding, melt-blowing, needle punching, air through, and point bonding. For example, when flexibility or draping properties are required, spunlacing is preferred, whereas when bulkiness or softness is required, thermal bonding is preferred.

Note that the surface of the top sheet 10 is preferably provided with a hydrophilizer applied in advance.

<Back Sheet>

The back sheet 11 is formed of a polyolefin-based resin, such as polyethylene or polypropylene, laminated nonwoven fabric having nonwoven fabric laminated over a polyethylene sheet or the like, or nonwoven fabric having a waterproof film interposed therein to substantially secure liquid-impermeability (in this case, the back sheet 1 is composed of the waterproof film and the nonwoven fabric). It is indisputable that, other than these, liquid-impervious, moisture-permeable materials may also be used which are preferably used for preventing dampness recently. A sheet of such a liquid-impervious, moisture-permeable material may be a microporous sheet obtained by kneading an inorganic filler in a polyolefin-based resin, such as polyethylene or polypropylene, forming the resulting mixture into a sheet, and then uni- or biaxially drawing the sheet. Also, nonwoven fabric of microdenier fibers, or sheets that have been rendered liquid-impervious without using waterproof film through a process, such as enhancement of leak proof property by applying heat or pressure to minimize interfiber gaps, or coating with a highly water-absorbable resin or a hydrophobic resin or water repellent, may be used as the back sheet 11.

<Exterior Sheet>

The exterior sheet 12 is for supporting and fitting the absorbent element 20 on a wearer. The exterior sheet 12 is shaped like an hourglass having its middle portion in the front-back direction narrowed on the opposed lateral sides, with which the legs of the wearer are surrounded.

The exterior sheet 12 is preferably formed of nonwoven fabric. The type of the nonwoven fabric is not particularly limited, and its raw material fibers may be synthetic fibers, such as polyolefin-based including polyethylene or polypropylene, polyester-based, or polyamide-based fibers, recycled fibers, such as rayon or cupra, or natural fibers, such as cotton. The nonwoven fabric may have been processed by spunlacing, spunbonding, thermal bonding, air through, needle punching, or the like process. Among these, continuous fiber nonwoven fabric, such as spunbonded nonwoven fabric, SMS nonwoven fabric, SMMS nonwoven fabric, or the like are preferred for reconciling texture and strength. One or a plurality of sheets in a stack of nonwoven fabric may be used. In the latter case, sheets of nonwoven fabric may preferably be bonded with an adhesive or the like. The nonwoven fabric, when used, may preferably has a fiber basis weight of 10 to 50 g/m², particularly 15 to 30 g/m².

<Intermediate Sheet>

The intermediate sheet 15 is formed of a material similar to the one for the top sheet 10. The intermediate sheet 15 is preferably joined to the top sheet 10 and, when joined by heat embossing or ultrasonic melt-bonding, preferably made of a material having a melting point similar to that of the top sheet 10. When the intermediate sheet 15 is formed of nonwoven fabric, the fineness of the fibers of the nonwoven fabric may preferably be about 2.0 to 5.0 dtex.

<Absorbent Body>

The absorber body 21 may be formed of an assembly of fibers. Such an assembly of fibers may be an accumulation of short fibers of fluff pulp, synthetic fibers, or the like, as well as an assembly of filaments obtained by opening, where necessary, a tow (fiber bundle) of synthetic fibers, such as cellulose acetate. The fiber basis weight may be about 100 to 300 g/m² for an accumulation of fluff pulp or short fibers, and about 30 to 120 g/m² for an assembly of filaments. The fineness of the synthetic fibers, when used, is, for example, 1 to 16 dtex, preferably 1 to 10 dtex, more preferably 1 to 5 dtex. In an assembly of filaments, the filaments may be of uncrimped fibers, but crimped fibers are preferred. The number of crimps of the crimped fibers may be, for example, 5 to 75, preferably 10 to 50, more preferably about 15 to 50 per inch. Uniformly crimped fibers are often used.

The absorbent body 21 preferably contains superabsorbent polymer particles, and in particular, preferably has superabsorbent polymer particles (SAP particles) dispersed with respect to the assembly of fibers substantially all over its thickness, at least in the liquid-receiving area.

The SAP particles, when absent or present only in a slight amount in the top, bottom, or middle portion of the absorbent body 21, cannot be said as being "dispersed substantially all over its thickness". The phrase "dispersed substantially all over its thickness" encompasses not only an embodiment wherein the SAP particles are dispersed "homogenously" with respect to the assembly of fibers all over the thickness, but also an embodiment wherein the SAP particles are "unevenly distributed" in the top, bottom, and/or middle portion, yet dispersed in each of the top, bottom, and middle portion. Further, embodiments are not excluded wherein part of the SAP particles remain on the surface of the fiber assembly without intruding therein, or pass through the fiber assembly to rest on the packing sheet 22.

The superabsorbent polymer particles include not only "particles" but also "powders". The particle size of the superabsorbent polymer particles may be the one used in this type of disposable diapers as it is, and may preferably be 1000 μm or smaller, particularly preferably 150 to 400 μm. Any material of the superabsorbent polymer particles may be used without particular limitation, and those having a water absorption of 40 g/g or more are preferred. The superabsorbent polymer particles may be of starch-based, cellulose-based, or synthetic polymer-based, and starch-acrylic acid (salt) graft copolymers, saponified products of starch-acrylonitrile copolymers, cross-linked sodium carboxymethyl cellulose, or acrylic acid (salt) polymers may be used. The superabsorbent polymer particles may preferably be in ordinary powder or granular form, but particles in other forms may also be used.

The superabsorbent polymer particles having a water absorption rate of 70 seconds or less, particularly 40 seconds or less, may preferably be used. With too low a water absorption rate, so-called back flow may likely to occur, wherein liquid supplied into the absorber body 21 returns out of the absorber body 21.

The basis weight of the superabsorbent polymer particles may suitably be decided depending on the amount of absorption required in an intended use of the absorber body 21. Thus, it depends, but the basis weight may be 50 to 350 g/m². With a polymer basis weight of less than 50 g/m², the amount of absorption may hardly be acquired. A basis weight over 350 g/m² not only saturates the effect, but also causes grainy discomfort due to excessive amount of the superabsorbent polymer particles.

<Packing Sheet>

The packing sheet 22 may be formed of tissues, in particular, crepe paper, nonwoven fabric, polyethylene-laminated nonwoven fabric, perforated sheet, or the like, provided that preferably the sheet will not allow escape of the superabsorbent polymer particles. When nonwoven fabric is used in place of crepe paper, hydrophilic SMMS (spun-bonded/melt-blown/melt-blown/spunbonded) nonwoven fabric is particularly preferred, which may be made of polypropylene, polyethylene/polypropylene, or the like. The fiber basis weight is preferably 5 to 40 g/m², particularly 10 to 30 g/m².

<Three-Dimensional Gather Part>

The gathered sheets 31 of the three-dimensional gather parts 30 may be formed of water-repellent nonwoven fabric, and the elastic members 32 may be formed of rubber threads. A plurality of the elastic members may be provided on each gather part, or only one elastic member may be provided on each gather part.

Each gathered sheet 31 has a starting edge for widthwise joining on a lateral side portion of the top sheet 10, and the surface of the gathered sheet 31 opposite from the body-facing surface in the portion outwards in the width direction of this joining edge is bonded to a lateral side portion of the back sheet 11 and a lateral side portion of the exterior sheet 12 located outwards thereof in the width direction, with a hot melt adhesive or the like.

In the round-leg areas, each three-dimensional gather part 30 inwards in the width direction of the joining starting edge is fixed to the top sheet 10 at both end portions in the product front-back direction, while the portion between these end portions of the gather part is a non-fixed free portion, which stands up under the contracting force of the elastic members 32. The diaper, when worn, takes a vessel-like shape to fit on the body while the contracting force of the elastic members 32 acts, so that the three-dimensional gather parts 30 stand up under the contracting force of the elastic members 32 to be brought into close contact onto the legs. As a result, so-called side leakage around the legs may be kept from occurring.

<Planar Gathers>

Between the gathered sheet 31 and the back sheet 11, round-leg elastic members 41, such as rubber threads, are fixed stretched in the front-back direction. A plurality of the round-leg elastic members 41 may be provided on each side, or only one elastic member may be provided on each side.

<Fastening Tape>

The base member 51 of each fastening tape 50 in its basal portion is fixed between the gathered sheet 31 and the exterior sheet 12 with a hot melt adhesive or the like. The base member 51 is formed of nonwoven fabric, plastic film, polyethylene-laminated nonwoven fabric, paper, or a composite material thereof.

The engaging part 52 is formed of a hook member of a mechanical fastener. The hook member has a number of engaging projections on its outer surface, and the engaging projections may be in (A) tick-shaped, (B) J-shaped, (C) mushroom-shaped, (D) T-shaped, or (E) double J-shaped (wherein J-shaped parts are joined back to back), and any shape may be employed. It is indisputable that the engaging part of the fastening tape 50 may be a pressure-sensitive adhesive layer.

<Target Sheet>

The target sheet 53 is formed of plastic film, nonwoven fabric, or the like, having a multitude of thread loops on its surface.

<Stretchable Sheet>

The stretchable sheet 55 is for contracting the dorsal end flap EF to bring the same into close contact with the back of the wearer.

EXPLANATION OF TERMS IN THE SPECIFICATION

The following terms appearing in the present specification shall have the following means unless otherwise specified herein.

The "front-back (longitudinal) direction" refers to the direction connecting the ventral side (front side) and the dorsal side (back side), whereas the "width direction" refers to the direction orthogonal to the front-back direction (right-left direction).

The "top side" refers to the side of a disposable diaper, when worn, closer to the skin of the wearer, whereas the "underside" refers to the side of a disposable diaper, when worn, away from the skin of the wearer. The "top face" refers to the face of a member of a disposable diaper, when worn, closer to the skin of the wearer, whereas the "under face" refers to the face of a disposable diaper, when worn, away from the skin of the wearer.

The "MD" and "CD" refer to the flow direction (MD: machine direction) and the lateral direction orthogonal thereto (CD: cross direction) in the production facilities, respectively, and either one of these is aligned to the front-back direction of the product while the other is aligned to the width direction of the product. The MD of nonwoven fabric is the direction of fiber orientation in the nonwoven fabric. The fiber orientation refers to the direction along which the fibers of the nonwoven fabric are aligned, and may be identified, for example, by a measurement method pursuant to the fiber orientation testing method using zero-span tensile strength prescribed in TAPPI Standard Method T471, or by a simplified measurement method for determining the fiber orientation by the ratio of tensile strengths in the front-back direction and in the width direction.

The "spread state" refers to the state in which an article is spread flatly without contraction or slack.

The "stretch rate" refers to a value with respect to the natural length being 100%. For example, a 200% stretch rate is synonymous with stretch in two folds.

The "gel strength" is determined as follows. To 49.0 g of artificial urine, 1.0 g of superabsorbent polymer is added and stirred with a stirrer. The resulting gel is left in a chamber with constant temperature and humidity at 40° C. at 60% RH for 3 hours, and then the temperature is returned to the ordinary temperature. The gel strength is measured in a curd meter (Curdmeter-MAX ME-500 manufactured by I. techno Engineering).

The "artificial urine" is a mixture of 2 wt % urea, 0.8 wt % sodium chloride, 0.03 wt % calcium chloride dihydrate, 0.08 wt % magnesium sulfate heptahydrate, and 97.09 wt % ion-exchanged water, and is used at 40° C. unless otherwise specified herein.

The "basis weight" is determined as follows. A specimen or test piece is preliminarily dried, left in a laboratory or in apparatus under the standard conditions (23±1° C. temperature and 50±2% relative humidity in the testing location) until constant mass is attained. The preliminary drying refers to attaining constant mass from a specimen or test piece in the environment at a temperature of 100° C. No preliminary drying may be performed on fibers with an official regain of 0.0%. From the test piece of the constant mass, a specimen of 100 mm×100 mm size is cut out using a sampling template (100 mm×100 mm). The weight of the specimen is measured and multiplied by 100 times to calculate the weight per 1 $m^2$, which is taken as the basis weight.

The "thickness" is automatically measured using an automatic thickness meter (KES-G5 handy compression tester program) under a load of 0.098 $N/cm^2$ with the compression area of 2 $cm^2$.

The "water absorption" is determined in accordance with JIS K7223-1996 "Testing method for water absorption capacity of super absorbent polymers".

The water absorption rate is defined as the "time spent until the end point is reached" in carrying out JIS K7224-1996 "Testing method for water absorption rate of super absorbent polymers" using 2 g of superabsorbent polymer and 50 g of saline.

A test or measurement shall be, in the absence of description about environmental conditions, performed in a laboratory or in apparatus under the standard conditions (23±1° C. temperature and 50±2% relative humidity in the testing location).

The size of each part refers to the size not in the natural length state but in the spread state, unless otherwise specified.

INDUSTRIAL APPLICABILITY

The present invention is applicable to apparatus for assessing performance of absorbent articles, such as disposable diapers.

DESCRIPTION OF REFERENCE SIGNS

1: mount
2: inner mount part
3: outer mount part
4: cradle
5: loading member
62: dorsal buttress
63: ventral buttress
65: defecation port
66: male urethral port (urethral port)
67: female urethral port (urethral port)
70: base plate
71: left side plate (side plate)
72: right side plate (side plate)
73: pivot shaft
74: bearing member
75: arm
75A: aperture (second aperture)
75B: aperture (second aperture)
76: back supporting shaft (supporting shaft)
77: front supporting shaft (supporting shaft)

81: aperture (first aperture)
82: aperture (first aperture)
L1: first virtual line
L2: second virtual line

The invention claimed is:

1. An apparatus for assessing performance of an absorbent article, comprising:
   a mount including an inner mount part for bearing a body-facing surface of an absorbent article and an outer mount part for bearing a surface of the absorbent article opposite from the body-facing surface, and a cradle for supporting the mount,
   wherein the inner mount part is formed of a transparent resin which allows visual observation from inside to outside the inner mount part, and the outer mount part is formed of a transparent resin which allows visual observation from outside to inside the outer mount part, and
   wherein an external contour of the inner mount part represents figures of abdomen and hips of a wearer, and an internal contour of the outer mount part represents figures of the abdomen and the hips of the wearer and is larger in size than the external contour of the inner mount part.

2. The apparatus for assessing performance of an absorbent article according to claim 1, further comprising:
   as seen from above, in a middle in a width direction of the internal contour of the inner mount part, a dorsal buttress extending forward from a back portion of the inner contour and a ventral buttress extending backward from a front portion of the inner contour,
   wherein, as seen from side, a defecation port is formed in the dorsal buttress at a position corresponding to an anus of the wearer, and a urethral port is formed in the ventral buttress at a position corresponding to a urethral orifice of the wearer.

3. The apparatus for assessing performance of an absorbent article according to claim 2,
   wherein the urethral port comprises a male urethral port located corresponding to a urethral orifice of a male wearer, and a female urethral port located corresponding to a urethral orifice of a female wearer.

4. The apparatus for assessing performance of an absorbent article according to claim 1,
   wherein the cradle comprises a base plate, a pair of side plates provided in lateral portions opposed in a width direction of the base plate, an arm for bearing an external surface of the mount, a pivot shaft extending in the width direction to support a lower portion of the arm, and a bearing member for rotatably bearing the pivot shaft,
   wherein the cradle is configured, as seen from left side, to change an angle formed between a first virtual line extending in a top-bottom direction of the mount and a second virtual line extending in a front-back direction of the pivot shaft from 90 degrees to 30 degrees through counterclockwise rotation of the pivot shaft, and to change the angle formed between the first virtual line extending in the top-bottom direction of the mount and the second virtual line extending in the front-back direction of the pivot shaft from 90 degrees to 30 degrees through clockwise rotation of the pivot shaft.

5. The apparatus for assessing performance of an absorbent article according to claim 4,
   wherein the angle formed between the first virtual line and the second virtual line is held by inserting a supporting shaft extending in the width direction, through a pair of first apertures formed in the side plates and a second aperture formed in the arm.

6. The apparatus for assessing performance of an absorbent article according to claim 1, further comprising:
   a loading member to be mounted on an upper end of the inner mount part to apply a load onto the inner mount part.

\* \* \* \* \*